(12) United States Patent
Ishikawa et al.

(10) Patent No.: US 12,297,340 B2
(45) Date of Patent: May 13, 2025

(54) AQUEOUS DISPERSION, COATING FILM, COATED ARTICLE, AND METHOD FOR PRODUCING AQUEOUS DISPERSION

(71) Applicant: DAIKIN INDUSTRIES, LTD., Osaka (JP)

(72) Inventors: Takuji Ishikawa, Osaka (JP); Hidenori Ozaki, Osaka (JP); Katsuhiko Imoto, Osaka (JP); Yoshinari Fukuhara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1048 days.

(21) Appl. No.: 17/043,434

(22) PCT Filed: Mar. 27, 2019

(86) PCT No.: PCT/JP2019/013248
§ 371 (c)(1),
(2) Date: Sep. 29, 2020

(87) PCT Pub. No.: WO2019/189390
PCT Pub. Date: Oct. 3, 2019

(65) Prior Publication Data
US 2021/0070973 A1  Mar. 11, 2021

(30) Foreign Application Priority Data

Mar. 30, 2018  (JP) ................ 2018-069586

(51) Int. Cl.
| | | |
|---|---|---|
| C08L 27/12 | (2006.01) | |
| C08F 2/16 | (2006.01) | |
| C08F 2/44 | (2006.01) | |
| C08F 220/18 | (2006.01) | |
| C08F 230/08 | (2006.01) | |

(Continued)

(52) U.S. Cl.
CPC ............. *C08L 27/12* (2013.01); *C08F 2/16* (2013.01); *C08F 2/44* (2013.01); *C08F 220/18* (2013.01); *C08F 230/085* (2020.02); *C08F 259/08* (2013.01); *C08L 83/04* (2013.01); *C09D 151/003* (2013.01); *C08L 2201/50* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 6,350,806 B1 | 2/2002 | Tsuda et al. | |
| 2004/0171736 A1* | 9/2004 | Dadalas | C08L 27/18 524/544 |

FOREIGN PATENT DOCUMENTS

| | | | |
|---|---|---|---|
| EP | 3 287 491 A1 | 2/2018 | |
| JP | 05170909 A | * | 7/1993 |

(Continued)

OTHER PUBLICATIONS

WO 2014112252 A1 , Jul. 2014, machine translation (Year: 2014).*

(Continued)

*Primary Examiner* — Satya B Sastri
(74) *Attorney, Agent, or Firm* — Sughrue Mion, PLLC

(57) ABSTRACT

An aqueous dispersion containing a particulate resin composite that contains a fluorine-containing resin and an inorganic polymer. The fluorine-containing resin contains a hydrolyzable silyl group-containing unsaturated monomer unit.

14 Claims, 6 Drawing Sheets

(51) Int. Cl.
*C08F 259/08* (2006.01)
*C08L 83/04* (2006.01)
*C09D 151/00* (2006.01)

(56) References Cited

FOREIGN PATENT DOCUMENTS

| WO | 99/21919 A1 | 5/1999 | |
|---|---|---|---|
| WO | WO-2014112252 A1 * | 7/2014 | ............ C08F 214/18 |
| WO | 2017/043634 A1 | 3/2017 | |

OTHER PUBLICATIONS

JP-05170909-A., Jul. 1993, machine translation (Year: 1993).*
International Search Report for PCT/JP2019/013248 dated Jun. 18, 2019 (PCT/ISA/210).
International Preliminary Report on Patentability dated Oct. 6, 2020 from the International Bureau in International Application No. PCT/J P2019/013248.
Extended European Search Report for counterpart EP Appln. No. 19778188.3 dated Nov. 19, 2021.

* cited by examiner (a) (b) (c)

(a)　　　　　　　　　　　(b)

(a)　　　　　(b)　　　　　(c)

FIG.13
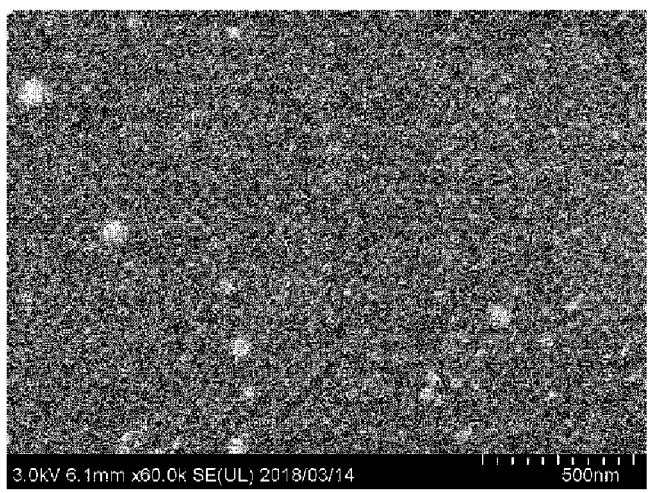
FIG.14
(a) (b) (c)
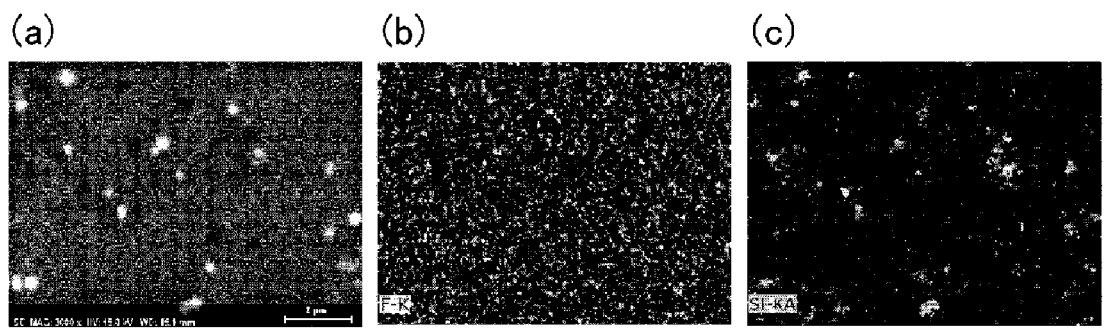
FIG.15
| | Example1 | Example3 | Comparative Example4 | Example5 | Example6 |
|---|---|---|---|---|---|
| TEM photograph | | | | | |

AQUEOUS DISPERSION, COATING FILM, COATED ARTICLE, AND METHOD FOR PRODUCING AQUEOUS DISPERSION

CROSS REFERENCE TO RELATED APPLICATIONS

This application is a National Stage of International Application No. PCT/JP2019/013248 filed Mar. 27, 2019, claiming priority based on Japanese Patent Application No 2018-069586 filed Mar. 30, 2018.

TECHNICAL FIELD

The invention relates to aqueous dispersions, coating films, coated articles, and methods for producing an aqueous dispersion.

BACKGROUND ART

Fluoropolymers are used in various industrial fields owing to their excellent properties such as weather resistance, chemical resistance, solvent resistance, heat resistance, and antifouling properties, and various studies have been made on fluoropolymers.

For example, Patent Literature 1 discloses a method for producing an aqueous dispersion of polymer particles. The method includes condensing 1.0 to 300 parts by weight of an organosilane compound in the presence of 100 parts by weight (in terms of solids content) of an aqueous dispersion of fluorine-based polymer particles.

CITATION LIST

Patent Literature

Patent Literature 1: JP H05-170909 A

SUMMARY OF INVENTION

Technical Problem

In view of the current state of the art as described above, the disclosure aims to provide an aqueous dispersion capable of forming a coating film excellent in adhesion to a base material. The disclosure also provides a method for producing an aqueous dispersion which is capable of forming a coating film excellent in adhesion to a base material.

Solution to Problem

One aspect of the disclosure relates to an aqueous dispersion containing a particulate resin composite that contains a fluorine-containing resin and an inorganic polymer, the fluorine-containing resin containing a hydrolyzable silyl group-containing unsaturated monomer unit.

The fluorine-containing resin preferably contains a fluoropolymer and a (meth)acrylic polymer, and the (meth)acrylic polymer preferably contains the hydrolyzable silyl group-containing unsaturated monomer unit.

Another aspect of the disclosure relates to an aqueous dispersion containing a particulate resin composite that contains a fluorine-containing resin and an inorganic polymer, the inorganic polymer being segregated on a particle surface of the resin composite.

The fluorine-containing resin preferably contains a fluoropolymer and a (meth)acrylic polymer.

The inorganic polymer is preferably a polysiloxane.

The resin composite preferably has an intensity ratio (silicon atom/fluorine atom) between silicon atoms and fluorine atoms, as determined by a semiquantitative method using a transmission electron microscope, of 0.15 or higher.

The fluoropolymer preferably contains at least one unit derived from a fluoroolefin selected from the group consisting of vinyl fluoride, vinylidene fluoride, tetrafluoroethylene, hexafluoropropylene, and chlorotrifluoroethylene.

The aqueous dispersion of the disclosure is preferably an aqueous coating material.

Another aspect of the disclosure relates to a coating film obtainable from the aqueous dispersion.

Another aspect of the disclosure relates to a coated article obtainable by applying the aqueous dispersion to a base material.

Another aspect of the disclosure relates to a method for producing an aqueous dispersion including: seed polymerizing a (meth)acrylic monomer and a hydrolyzable silyl group-containing unsaturated monomer in an aqueous dispersion containing a fluoropolymer; and polycondensing silanol in the presence of a (meth)acrylic polymer obtained by the seed polymerization.

The polycondensing is preferably performed under acidic conditions.

The seed polymerizing and the polycondensing are preferably performed successively at a maintained temperature of 50° C. or higher.

Advantageous Effects of Invention

The aqueous dispersion of the disclosure having the features described above can provide a coating film excellent in adhesion to a base material. The production method of the disclosure can provide an aqueous dispersion capable of forming a coating film excellent in adhesion to a base material.

BRIEF DESCRIPTION OF DRAWINGS

FIG. 13 is a secondary electron image obtained from SEM observation of the surface of a coating film obtained using an aqueous dispersion from Comparative Example 3.

FIG. 14 includes a backscattered electron image and elemental mapping images obtained from SEM observation of the surface of the coating film obtained using the aqueous dispersion from Comparative Example 3.

FIG. 15 includes photographs each obtained from TEM measurement of an aqueous dispersion from an example or a comparative example.

DESCRIPTION OF EMBODIMENTS

Figure 1:
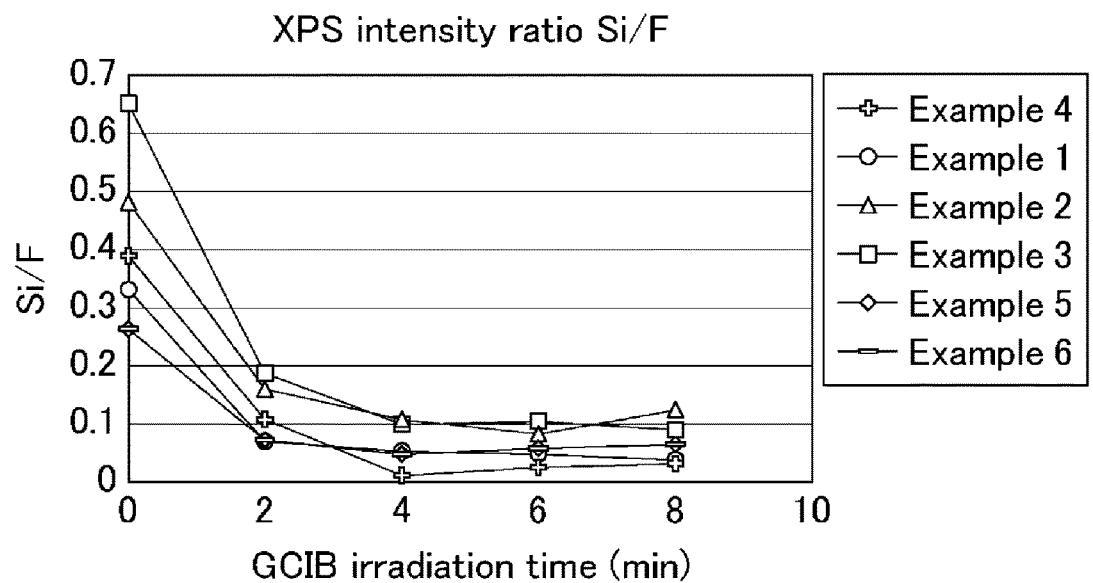
FIG. 1 is a graph summarizing the results of XPS measurement on the surfaces of coating films obtained in Examples 1 to 6.

The invention is described in detail below.

One aspect of the disclosure relates to an aqueous dispersion containing a particulate resin composite that contains a fluorine-containing resin and an inorganic polymer, the fluorine-containing resin containing a hydrolyzable silyl group-containing unsaturated monomer unit (hereinafter, such an aqueous dispersion is also referred to as a "first aqueous dispersion of the disclosure").

The fluorine-containing resin contains a hydrolyzable silyl group-containing unsaturated monomer unit. Such an aqueous dispersion can form a coating film with better solvent resistance, antifouling properties, and adhesion to a base material.

The particulate resin composite contains a fluorine-containing resin and an inorganic polymer in one and the same particle. In other words, the particulate resin composite preferably contains an inorganic polymer in each particle.

In this respect, the aqueous dispersion of the disclosure is different from an aqueous dispersion obtainable by simply mixing a fluorine-containing resin and an inorganic polymer.

The fluorine-containing resin and the inorganic polymer in one and the same particle may or may not be chemically bonded.

The hydrolyzable silyl group is preferably a group represented by the formula:

$$-SiX^1{}_nX^2{}_{3-n}$$

wherein $X^1$ represents a C1-10 alkoxy group; $X^2$ represents H or a C1-C10 alkyl group; and n represents an integer of 1 to 3.

The hydrolyzable silyl group preferably has high reactivity in terms of improvement in solvent resistance of the coating film. The hydrolyzable silyl group is more preferably $-Si(OCH_3)_nX^2{}_{3-n}$ or $-Si(OC_2H_5)_nX^2{}_{3-n}$, still more preferably $-Si(OCH_3)_3$ or $-Si(OC_2H_5)_3$.

The fluorine-containing resin containing the hydrolyzable silyl group-containing unsaturated monomer unit is obtainable by introducing a polymerized unit derived from a hydrolyzable silyl group-containing unsaturated monomer (hereinafter, such a unit is also referred to as a "hydrolyzable silyl group-containing unsaturated monomer unit") into a polymer constituting the resin.

Examples of the hydrolyzable silyl group-containing unsaturated monomer include
$CH_2=CHSi(OCH_3)_3$,
$CH_2=CHSi(CH_3)(OCH_3)_2$, $CH_2=C(CH_3)Si(OCH_3)_3$,
$CH_2=C(CH_3)Si(CH_3)(OCH_3)_2$,
$CH_2=CHSi(OC_2H_5)_3$,
$CH_2=CHSi(OC_3H_7)_3$,
$CH_2=CHSi(OC_4H_9)_3$,
$CH_2=CHSi(OC_6H_{13})_3$,
$CH_2=CHSi(OC_8H_{17})_3$,
$CH_2=CHSi(OC_{10}H_{21})_3$,
$CH_2=CHSi(OC_{12}H_{25})_3$,
$CH_2=CHCOO(CH_2)_3Si(OCH_3)_3$,
$CH_2=CHCOO(CH_2)_3Si(CH_3)(OCH_3)_2$,
$CH_2=CHCOO(CH_2)_3Si(OC_2H_5)_3$,
$CH_2=CHCOO(CH_2)_3Si(CH_3)(OC_2H_5)_2$,
$CH_2=C(CH_3)COO(CH_2)_3Si(OCH_3)_3$,
$CH_2=C(CH_3)COO(CH_2)_3Si(CH_3)(OCH_3)_2$,
$CH_2=C(CH_3)COO(CH_2)_3Si(OC_2H_5)_3$,
$CH_2=C(CH_3)COO(CH_2)_3Si(CH_3)(OC_2H_5)_2$,
$CH_2=C(CH_3)COO(CH_2)_2O(CH_2)_3Si(OCH_3)_3$,
$CH_2=C(CH_3)COO(CH_2)_2(CH_2)_3Si(CH_3)(OCH_3)_2$,
$CH_2=C(CH_3)COO(CH_2)_{11}Si(OCH_3)_3$,
$CH_2=C(CH_3)COO(CH_2)_{11}Si(CH_3)(OCH_3)_2$,
$CH_2=CHCH_2OCO(o-C_6H_4)COO(CH_2)_3Si(OCH_3)_3$,
$CH_2=CHCH_2OCO(o-C_6H_4)COO(CH_2)_3Si(CH_3)(OCH_3)_2$,
$CH_2=CH(CH_2)_4Si(OCH_3)_3$,
$CH_2=CH(CH_2)_8Si(OCH_3)_3$,
$CH_2=CHO(CH_2)_3Si(OCH_3)_3$,
$CH_2=CHCH_2O(CH_2)_3Si(OCH_3)_3$, and
$CH_2=CHCH_2OCO(CH_2)_{10}Si(OCH_3)_3$.

In order to form a coating film with better solvent resistance, antifouling properties, and adhesion to a base material, the amount of the hydrolyzable silyl group-containing unsaturated monomer unit is preferably 0.01% by mass or more, more preferably 0.1% by mass or more, while preferably 5% by mass or less, more preferably 3% by mass or less, of all the monomer units of the polymer constituting the fluorine-containing resin. Too large an amount of the hydrolyzable silyl group-containing unsaturated monomer unit may cause impaired transparency of the coating film. Too small an amount thereof may cause impaired solvent resistance and adhesion to a base material of the coating film.

The fluorine-containing resin may consist only of a fluoropolymer or may be a mixture of a fluoropolymer and a polymer other than a fluoropolymer, such as a mixture of a fluoropolymer and a (meth)acrylic polymer.

The fluorine-containing resin is preferably a mixture of a fluoropolymer and a (meth)acrylic polymer, and the (meth)acrylic polymer preferably contains the hydrolyzable silyl group-containing unsaturated monomer unit.

In other words, the resin composite preferably contains a fluoropolymer, a (meth)acrylic polymer, and an inorganic polymer, and the (meth)acrylic polymer preferably contains a (meth)acrylic monomer unit and a hydrolyzable silyl group-containing unsaturated monomer unit. These features enable formation of a coating film excellent in adhesion to a base material. These features also enable formation of a coating film that shows sufficient properties of the fluoropolymer, (meth)acrylic polymer, and inorganic polymer, and is excellent not only in adhesion to a base material but also in properties such as the antifouling properties and solvent resistance.

In this case, the particulate resin composite contains a fluoropolymer, a (meth)acrylic polymer, and an inorganic polymer in one and the same particle. In this respect, the aqueous dispersion of the disclosure is different from an aqueous dispersion obtainable by simply mixing a fluoropolymer, a (meth)acrylic polymer, and an inorganic polymer.

The fluoropolymer, the (meth)acrylic polymer, and the inorganic polymer in one and the same particle may or may not be chemically bonded.

The inorganic polymer is preferably segregated on a particle surface of the resin composite. More specifically, the particulate resin composite is in the form of particles in which the inorganic polymer is segregated on the surface of each particle formed from the fluorine-containing resin.

Segregation of the inorganic polymer on the surface of each resin composite particle can be confirmed by, for example, determining the intensity ratio between inorganic atoms and fluorine atoms by a semiquantitative method using a transmission electron microscope.

For example, in the case where the inorganic polymer is a polysiloxane, the resin composite preferably has an intensity ratio between silicon atoms and fluorine atoms ((intensity of silicon atoms in particle portion−intensity of silicon atoms in portion without particles)/(intensity of fluorine atoms in particle portion−intensity of fluorine atoms in portion without particles (Blank)), as determined by the semiquantitative method using a transmission electron microscope, of 0.15 or higher.

The intensity ratio (silicon atoms/fluorine atoms) is more preferably 0.3 or higher, still more preferably 0.4 or higher, particularly preferably 0.5 or higher, while preferably 1.0 or lower, more preferably 0.9 or lower, still more preferably 0.8 or lower.

The intensity ratio can be measured by the following method.

[Method for Measuring Intensity Ratio (Silicon Atoms/Fluorine Atoms)]

One part by weight of the aqueous dispersion is diluted with 5000 parts by weight of pure water. The resulting dilution is sprayed on a transmission electron microscope observation mesh sheet on which a thin film is formed. The dilution is dried, so that particles to be subjected to semiquantitative analysis adhere to the mesh sheet. In order to prevent charging, the mesh sheet is coated with osmium to a film thickness of about 5 nm in an osmium coater (Neoc-Pro neo osmium coater available from Meiwafosis Co., Ltd.) under the following film-forming conditions: a degree of vacuum of 2 Pa and a time of 10 seconds.

The particles on the mesh sheet sample are subjected to STEM observation using a scanning transmission electron microscope at an observation magnification of ×225000 and an image size of 1024×1024 pixels. The sample is scanned 58 times with an accelerating voltage of 200 kV and a scanning time of 609 seconds. Simultaneously with the STEM observation, the sample is scanned 29 times with a scanning time of 609 seconds for elemental mapping using an energy-dispersive X-ray spectroscope (Super-X available from FEI Company Japan Ltd.). Based on the obtained data, semiquantitative analysis of the elements, namely fluorine and silicon, in a portion with particles (Particles) and in a portion without particles (Blank) using image analysis software (ESPRIT 1,9 available from Bruker BioSpin). Using the intensity of each element, the Si/F intensity ratio (silicon atoms/fluorine atoms=(intensity of silicon atoms in portion with particles (Particles)−intensity of silicon atoms in portion without particles (Blank))/(intensity of fluorine atoms in portion with particles (Particles)−intensity of fluorine atoms in portion without particles (Blank))) is calculated.

The resin composite preferably has a core-shell structure consisting of a resinous core formed from a fluorine-containing resin (preferably, a fluoropolymer and a (meth) acrylic polymer) and a shell formed from an inorganic polymer. The shell portion of the resin composite preferably has a thickness of 5 nm or more, more preferably 10 nm or more, still more preferably 15 nm or more, even more preferably 20 nm or more. The upper limit of the thickness of the shell portion is not limited, and may be 50 nm or 40 nm.

The thickness of the shell portion can be measured using, for example, a scanning transmission electron microscope.

The fluorine-containing resin and the fluoropolymer each preferably contain a unit derived from a fluoroolefin. Examples of the fluoroolefin include perfluoroolefins such as tetrafluoroethylene (TFE), hexafluoropropylene (HFP), perfluoro(alkyl vinyl ethers) (PAVES),

[Chem.1]

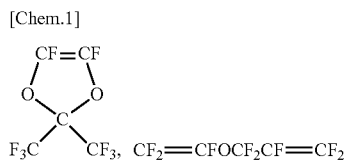

and non-perfluoroolefins such as chlorotrifluoroethylene (CTFE), vinyl fluoride (VF), vinylidene fluoride (VdF), trifluoroethylene, trifluoropropylene, hexafluoroisobutene, 2,3,3,3-tetrafluoropropene, 1,3,3,3-tetrafluoropropene, and 1,1,3,3,3-pentafluoropropene. Examples of the perfluoro(alkyl vinyl ethers include perfluoro(methyl vinyl ether) (PMVE), perfluoro(ethyl vinyl ether) (PEVE), and perfluoro (propyl vinyl ether) (PPVE).

The fluoroolefin may be a functional group-containing fluoroolefin.

Examples of the functional group-containing fluoroolefin include compounds represented by the following formula:

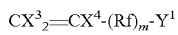

wherein $Y^1$ is —OH, —COOM$^2$, —SO$_2$F, —SO$_3$M$^2$ (M$^2$ is a hydrogen atom, a NH$_4$ group, or an alkali metal), a carboxylic acid salt, a carboxy ester group, an epoxy group, or a cyano group; $X^3$ and $X^4$ are the same as or different from each other and each represent a hydrogen atom or a fluorine atom; Rf is a C1-C40 divalent fluorine-containing alkylene group, a C1-C40 divalent fluorine-containing oxyalkylene group, a C2-C40 ether linkage-containing divalent fluorine-containing alkylene group, or a C2-C40 ether linkage-containing divalent fluorine-containing oxyalkylene group; and m is 0 or 1.

Fluoroolefins represented by the following formulas:

[Chem.2]

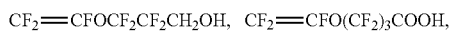

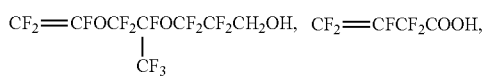

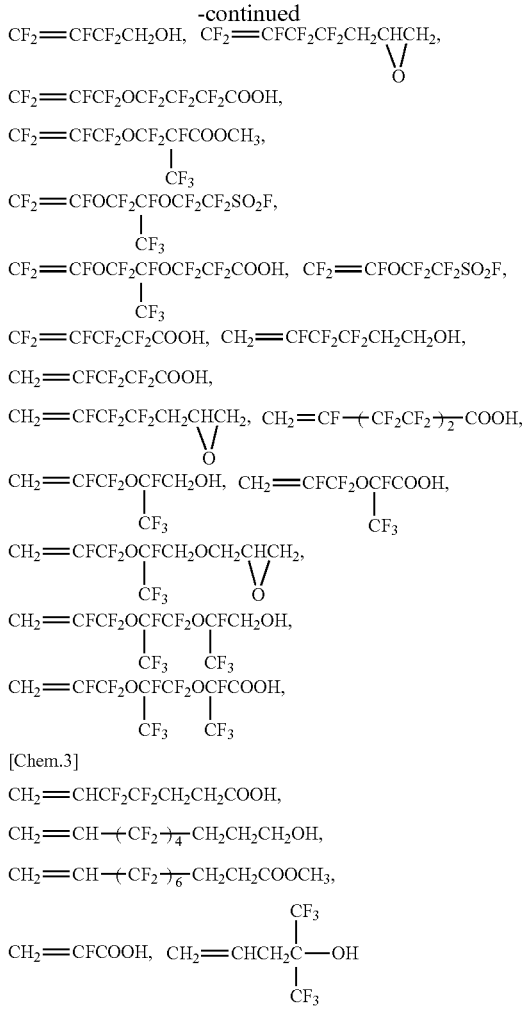

are mentioned as specific examples of the functional group-containing fluoroolefin.

Examples of the fluoroolefin include iodine-containing monomers such as iodinated perfluorovinyl ethers (e.g., perfluoro(6,6-dihydro-6-iodo-3-oxa-1-hexene) and perfluoro(5-iodo-3-oxa-1-pentene) disclosed in JP H05-63482 B or JP S62-12734 A).

In particular, the fluoroolefin is preferably at least one selected from the group consisting of vinyl fluoride, vinylidene fluoride, tetrafluoroethylene, hexafluoropropylene, and chlorotrifluoroethylene.

More preferred as the fluoroolefin are vinylidene fluoride and at least one selected from the group consisting of tetrafluoroethylene, hexafluoropropylene, and chlorotrifluoroethylene.

The fluorine-containing resin and the fluoropolymer may each optionally contain a non-fluorinated monomer unit copolymerizable with a fluoroolefin in addition to the fluoroolefin unit. Examples of the non-fluorinated monomer copolymerizable with the fluoroolefin include olefins such as ethylene, propylene, isobutylene, and n-butene; vinyl ether monomers such as ethyl vinyl ether, cyclohexyl vinyl ether, and methyl vinyl ether; vinyl ester monomers such as vinyl acetate, vinyl versatate, vinyl benzoate, vinyl pivalate, vinyl laurate, vinyl stearate, and vinyl cyclohexylecarboxylate; allyl ether monomers such as polyoxyethylene allyl ether, ethyl allyl ether, hydroxyethyl allyl ether, and allyl alcohol; acrylic acid, acrylic acid esters, methacrylic acid, and methacrylic acid esters described below. In particular, ethyl vinyl ether, cyclohexyl vinyl ether, and vinyl versatate are preferred in order to enhance the miscibility, coating film hardness, coating film transparency, and film-forming properties when the aqueous dispersion is used as a coating material.

The non-fluorinated monomer copolymerizable with the fluoroolefin preferably contains a functional group having high affinity with an aqueous medium in terms of stability. The functional group is preferably a carboxyl group or a hydroxy group.

Examples of the monomer containing a carboxyl group include unsaturated carboxylic acids such as undecylenic acid, crotonic acid, maleic acid, maleic acid monoester, vinylacetic acid, cinnamic acid, 3-allyloxypropionic acid, itaconic acid, itaconic acid monoester, acrylic acid, and methacrylic acid.

Examples of the monomer containing a hydroxy group include hydroxy group-containing vinyl monomers such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, and glycerol monoallyl ether. In particular, 2-hydroxyethyl vinyl ether, 4-hydroxybutyl vinyl ether, undecylenic acid, crotonic acid, acrylic acid, and methacrylic acid are preferred in terms of excellent polymerization reactivity and curability.

In order to form a coating film with better solvent resistance, antifouling properties, and adhesion to a base material, the fluoropolymer preferably contains a vinylidene fluoride unit as a fluoroolefin unit. In terms of miscibility with the (meth)acrylic polymer, the fluoropolymer preferably contains the vinylidene fluoride unit in an amount of 50 mol % or more, more preferably 70 mol % or more, while preferably 95 mol % or less of all the polymerized units constituting the fluoropolymer.

The fluoropolymer is preferably at least one selected from the group consisting of VdF/TFE/CTFE copolymers (VTC), VdF/TFE copolymers, VdF/TFE/HFP copolymers, VdF/CTFE copolymers, VdF/HFP copolymers, and PVdF. The fluoropolymer is more preferably at least one selected from the group consisting of VdF/TFE/CTFE=(40 to 99)/(1 to 50)/(0 to 30) (mol %), VdF/TFE=(50 to 99)/(1 to 50) (mol %), VdF/TFE/HFP=(45 to 99)/(0 to 35)/(5 to 50) (mol %), VdF/CTFE=(40 to 99)/(1 to 30) (mol %), and VdF/HFP=(50 to 99)/(1 to 50) (mol %).

In particular, the fluoropolymer is preferably a VdF/TFE/CTFE copolymer. The VdF/TFE/CTFE copolymer is more preferably VdF/TFE/CTFE=(40 to 99)/(1 to 49.9)/(0.1 to 30) (mol %), still more preferably VdF/TFE/CTFE=(50 to 95)/(2.5 to 25)/(2.5 to 25) (mol %), particularly preferably VdF/TFE/CTFE=(70 to 90)/(5 to 20)/(5 to 20) (mol %).

In the case where the fluorine-containing resin consists only of a fluoropolymer, the fluoropolymer preferably contains the hydrolyzable silyl group-containing unsaturated monomer unit and a fluoroolefin unit. The fluoropolymer may optionally contain a non-fluorinated monomer unit copolymerizable with a fluoroolefin in addition to the fluoroolefin unit.

In this case, the amount of the hydrolyzable silyl group-containing unsaturated monomer unit is preferably 0.01% by mass or more, more preferably 0.1% by mass or more, while preferably 5% by mass or less, more preferably 3% by mass or less, of all the monomer units constituting the fluoropolymer. Too large an amount of the hydrolyzable silyl group-containing unsaturated monomer unit may cause impaired transparency of the coating film. Too small an amount thereof may cause impaired solvent resistance and adhesion to a base material of the coating film.

The whole amount of the fluoroolefin unit and the non-fluorinated monomer unit is preferably 95% by mass or more, more preferably 97% by mass or more.

In the case where the fluorine-containing resin consists only of a fluoropolymer, a non-fluorinated monomer copolymerizable with a fluoroolefin is preferably copolymerized with the fluoroolefin unit.

Preferred examples of the fluoroolefin unit include tetrafluoroethylene and chlorotrifluoroethylene in terms of good copolymerizability with a non-fluorinated monomer.

Preferred examples of the non-fluorinated monomer copolymerizable with a fluoroolefin unit include the non-fluorinated monomers mentioned above.

In particular, vinyl acetate, vinyl pivalate, ethyl vinyl ether, and cyclohexyl vinyl ether are preferred in order to enhance the miscibility with a curing agent, coating film hardness, coating film transparency, and film-forming properties.

Also preferred among the non-fluorinated monomers mentioned above are non-fluorinated monomers containing a hydroxy group or a carboxyl group. In particular, crotonic acid and undecylenic acid are preferred in terms of excellent stability of the aqueous dispersion.

The non-fluorinated monomer copolymerizable with a fluoroolefin may be a macromonomer. The macromonomer preferably has a hydrophilic site. In particular, a macromonomer having a vinyl ether group at one end is preferred as it has excellent copolymerizability with a fluoroolefin. The macromonomer may also have, at an end thereof, a crosslinkable functional group such as a hydroxy group or a carboxyl group.

The hydrolyzable silyl group-containing unsaturated monomer unit is preferably a vinylsilane.

Specific preferred examples thereof include
$CH_2$=$CHSi(OCH_3)_3$,
$CH_2$=$CHSi(CH_3)(OCH_3)_2$, $CH_2$=$C(CH_3)Si(OCH_3)_3$,
$CH_2$=$C(CH_3)Si(CH_3)(OCH_3)_2$,
$CH_2$=$CHSi(OC_2H_5)_3$,
$CH_2$=$CHSi(OC_3H_7)_3$,
$CH_2$=$CHSi(OC_4H_9)_3$,
$CH_2$=$CHSi(OC_6H_{13})_3$,
$CH_2$=$CHSi(OC_8H_{17})_3$,
$CH_2$=$CHSi(OC_{10}H_{21})_3$, and
$CH_2$=$CHSi(OC_{12}H_{25})_3$.

In the case where the non-fluorinated monomer copolymerizable with a fluoroolefin is copolymerized with the fluoroolefin, the composition of the resulting fluorine-containing copolymer, fluoroolefin/non-fluorinated monomer (except for non-fluorinated monomer having carboxyl group and hydrolyzable silyl group-containing unsaturated monomer)/non-fluorinated monomer having carboxyl group/hydrolyzable silyl group-containing unsaturated monomer (% by mass ratio), is preferably (30 to 60)/(10 to 69)/(0.01 to 10)/(0.01 to 5), more preferably (40 to 50)/(25 to 57)/(0.1 to 5)/(0.1 to 3).

In the case where the fluorine-containing resin is a mixture of a fluoropolymer and a (meth)acrylic polymer, the (meth)acrylic polymer preferably contains a hydrolyzable silyl group-containing unsaturated monomer unit. In this case, a coating film obtainable from the aqueous dispersion can have better solvent resistance, antifouling properties, and adhesion to a base material.

Examples of the hydrolyzable silyl group and the hydrolyzable silyl group-containing unsaturated monomer include the same as those mentioned above.

Preferred examples of the hydrolyzable silyl group-containing unsaturated monomer include
$CH_2$=$CHCOO(CH_2)_3Si(OCH_3)_3$,
$CH_2$=$CHCOO(CH_2)_3Si(CH_3)(OCH_3)_2$,
$CH_2$=$CHCOO(CH_2)_3Si(OC_2H_5)_3$,
$CH_2$=$CHCOO(CH_2)_3Si(CH_3)(OC_2H_5)_2$,
$CH_2$=$C(CH_3)COO(CH_2)_3Si(OCH_3)_3$,
$CH_2$=$C(CH_3)COO(CH_2)_3Si(CH_3)(OCH_3)_2$,
$CH_2$=$C(CH_3)COO(CH_2)_3Si(OC_2H_5)_3$,
$CH_2$=$C(CH_3)COO(CH_2)_3Si(CH_3)(OC_2H_5)_2$,
$CH_2$=$C(CH_3)COO(CH_2)_2O(CH_2)_3Si(OCH_3)_3$,
$CH_2$=$C(CH_3)COO(CH_2)_2(CH_2)_3Si(CH_3)(OCH_3)_2$,
$CH_2$=$C(CH_3)COO(CH_2)_{11}Si(OCH_3)_3$, and
$CH_2$=$C(CH_3)COO(CH_2)_{11}Si(CH_3)(OCH_3)_2$.

In order to form a coating film with better solvent resistance, antifouling properties, and adhesion to a base material, the amount of the hydrolyzable silyl group-containing unsaturated monomer unit is preferably 0.01% by mass or more, more preferably 0.1% by mass or more, while preferably 5% by mass or less, more preferably 3% by mass, of all the monomer units constituting the fluoropolymer and the (meth)acrylic polymer. Too large an amount of the hydrolyzable silyl group-containing unsaturated monomer unit may cause impaired transparency of the coating film. Too small an amount thereof may cause impaired solvent resistance and adhesion to a base material of the coating film.

The (meth)acrylic polymer contains a (meth)acrylic monomer unit. Examples of the (meth)acrylic monomer include (meth)acrylic acid and a (meth)acrylic acid ester. The "(meth)acrylic acid" herein means acrylic acid or methacrylic acid.

The (meth)acrylic polymer preferably contains at least one acrylic monomer unit selected from the group consisting of acrylic acid, acrylic acid esters, methacrylic acid, and methacrylic acid esters.

In order to form a coating film with better solvent resistance, antifouling properties, and adhesion to a base material, the whole amount of the (meth)acrylic acid ester unit is preferably 64% to 99.995% by mass, more preferably 74% to 99.99% by mass, and still more preferably 74% to 95.5% by mass of all the monomer units constituting the (meth)acrylic polymer.

In order to form a coating film with better solvent resistance, antifouling properties, and adhesion to a base material, the (meth)acrylic polymer preferably contains an acrylic acid ester unit or a methacrylic acid ester unit, more preferably an acrylic acid ester unit and a methacrylic acid ester unit.

The terms "(meth)acrylic acid ester", "acrylic acid ester", and "methacrylic acid ester", when simply mentioned herein, exclude a (meth)acrylic monomer containing a hydrolyzable silyl group.

The (meth)acrylic acid ester is preferably an acrylic acid alkyl ester having a C1-C10 alkyl group or a methacrylic acid alkyl ester having a C1-C10 alkyl group. Examples of the (meth)acrylic acid ester include (meth)acrylic acid alkyl esters such as methyl acrylate, ethyl acrylate, n-propyl acrylate, isopropyl acrylate, n-butyl acrylate, methyl methacrylate, n-propyl methacrylate, ethyl methacrylate, n-butyl methacrylate, isopropyl methacrylate, 2-ethylhexyl acrylate, 2-ethylhexyl methacrylate, cyclohexyl acrylate, and cyclohexyl methacrylate.

The examples also include hydroxy group-containing (meth)acrylic acid esters such as 2-hydroxyethyl methacrylate (2-HEMA), 2-hydroxyethyl acrylate (2-HEA), 3-hydroxypropyl methacrylate, 3-hydroxypropyl acrylate, 2-hydroxypropyl methacrylate, 2-hydroxypropyl acrylate, 4-hydroxybutyl acrylate, 4-hydroxybutyl methacrylate, 2-hydroxybutyl acrylate, 2-hydroxybutyl methacrylate, 6-hydroxyhexyl acrylate, and 6-hydroxyhexyl methacrylate. In particular, at least one selected from the group consisting of 2-HEMA and 2-HEA is preferred. The amount of the hydroxy group-containing (meth)acrylic acid ester unit is preferably 0 to 20% by mass of all the monomer units constituting the (meth)acrylic polymer.

The hydroxy group as used herein is a group represented by —OH, excluding a hydroxy group constituting a carboxyl group (—COOH).

The (meth)acrylic acid ester is preferably at least one selected from the group consisting of methyl methacrylate, n-butyl methacrylate, n-butyl acrylate, 2-ethylhexyl methacrylate, 2-ethylhexyl acrylate, and cyclohexyl methacrylate.

The (meth)acrylic polymer preferably contains a hydrophilic group such as a hydroxy group or a carboxyl group in terms of long-term stability of the aqueous dispersion. Particularly preferred is a carboxyl group.

In order to form a coating film with better solvent resistance, antifouling properties, and adhesion to a base material, the (meth)acrylic polymer also preferably contains an unsaturated carboxylic acid unit.

Examples of the unsaturated carboxylic acid include acrylic acid, methacrylic acid, vinylacetic acid, crotonic acid, cinnamic acid, 3-allyloxypropionic acid, 3-(2-allyloxyethoxycarbonyl)propionic acid, itaconic acid, itaconic acid monoesters, maleic acid, maleic acid monoesters, maleic anhydrides, fumaric acid, fumaric acid monoesters, vinyl phthalate, vinyl pyromellitate, and undecylenic acid. Preferred is at least one selected from the group consisting of acrylic acid, methacrylic acid, vinylacetic acid, crotonic acid, itaconic acid, maleic acid, maleic acid monoesters, fumaric acid, fumaric acid monoesters, 3-allyloxypropionic acid, and undecylenic acid because they are less likely to form homopolymers due to their low homopolymerizability and they enable easy control of introduction of carboxyl groups. Particularly preferred is at least one selected from the group consisting of acrylic acid and methacrylic acid.

In order to form a coating film with better adhesion to a base material, the amount of the unsaturated carboxylic acid unit is preferably 0.1% to 10% by mass, more preferably 1% to 5% by mass of all the monomer units constituting the (meth)acrylic polymer.

In order to form a coating film with better solvent resistance, antifouling properties, and adhesion to a base material, the (meth)acrylic polymer also more preferably further contains a hydroxy group-containing (meth)acrylic acid ester unit.

In order to form a coating film with better solvent resistance, antifouling properties, and adhesion to a base material, the (meth)acrylic polymer still more preferably contains an acrylic acid ester unit, a methacrylic acid ester unit, an unsaturated carboxylic acid unit, a hydroxy group-containing (meth)acrylic acid ester unit, and a hydrolyzable silyl group-containing unsaturated monomer unit.

The resin composite contains an inorganic polymer. The inorganic polymer is a polymer whose skeleton is formed from an inorganic element. Examples of the inorganic element include silicon (Si), titanium (Ti), aluminum (Al), and zirconium (Zr). The inorganic element is preferably Si. The inorganic polymer is more preferably a polysiloxane.

Examples of the polysiloxane include a polycondensate of a hydrolysate of an organosilane represented by the following formula (3-1):

[Chem. 4]

$(R^1)_n—Si—(OR^2)_{4-n}$ (3-1)

wherein $R^1$ is a C1-C8 monovalent organic group, two $R^1$s may be the same as or different from each other; $R^2$ represents a C1-C5 linear or branched alkyl group or a C1-C6 acyl group, two $R^2$s may be the same as or different from each other; and n is an integer of 0 to 2. Preferably, n is 0 or 1.

Examples of the C1-C8 monovalent organic group for $R^1$ in the formula (3-1) include phenyl groups; linear, branched, or cyclic alkyl groups such as methyl, ethyl, n-propyl, i-propyl, n-butyl, i-butyl, sec-butyl, t-butyl, n-hexyl, n-heptyl, n-octyl, 2-ethylhexyl, cyclopentyl, and cyclohexyl groups; acyl groups such as acetyl, propionyl, butyryl, valeryl, benzoyl, trioyl, and caproyl groups; alkenyl groups such as vinyl and allyl groups, substitution derivatives of these groups, and epoxy, glycidyl, (meth)acryloyloxy, ureido, amide, fluoroacetamide, and isocyanate groups.

The substituent in the substitution derivative for $R^1$ may be, for example, a halogen atom, a substituted or unsubstituted amino group, a hydroxy group, a mercapto group, an isocyanate group, a glycidoxy group, a 3,4-epoxycyclohexyl group, a (meth)acryloyloxy group, an ureido group, or an ammonium salt group. Here, the total number of carbons of $R^1$ formed from any of these substitution derivatives is 8 or less, with the carbon atoms in the substituent included.

Examples of the C1-C5 linear or branched alkyl group for $R^2$ include methyl, ethyl, n-propyl, i-propyl, n-butyl, sec-butyl, t-butyl, and n-pentyl groups. Examples of the C1-C6 acyl group include acetyl, propionyl, butyryl, valeryl, and caproyl groups.

Specific examples of the organosilane include tetraalkoxysilanes such as tetramethoxysilane, tetraethoxysilane, tetra-n-propoxysilane, tetra-i-propoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloyloxypropyltrimethoxysilane, 3-(meth)acryloyloxypropyltriethoxysilane, 3-ureidopropyltrimethoxysilane, and 3-ureidopropyltriethoxysilane;

dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane, 3-glycidoxypropyldimethoxymethylsilane, and 3-glycidoxypropyldiethoxymethylsilane; methyltriacetyloxysilane, and dimethyldiacetyloxysilane.

Preferred among these organosilanes are tetraalkoxysilanes, trialkoxysilanes, and dialkoxysilanes. Preferred among the tetraalkoxysilanes is tetraethoxysilane. Preferred among the trialkoxysilanes are methyltrimethoxysilane and methyltriethoxysilane. Preferred among the dialkoxysilanes are dimethyldimethoxysilane and dimethyldiethoxysilane.

The organosilanes may be used alone or two or more of these may be used in combination.

A hydrolysate of the organosilane is a product containing a silanol (Si—OH) group formed by hydrolysis of Si—OR$^2$ groups in the organosilane. Here, not all the OR$^2$ groups in the organosilane need to be hydrolyzed.

A polycondensate of a hydrolysate of the organosilane is a product containing a siloxane (Si—O—Si) bond formed by condensation of silanol groups in the hydrolysate. Here, not all these groups need to be condensed, and only some of these groups may be condensed.

A polycondensate of the organosilane may be formed only from a trialkoxysilane or may be formed from a combination of 40 mol % to 99 mol % of a trialkoxysilane and 60 mol % to 1 mol % of a tetraalkoxysilane. A trialkoxysilane and a tetraalkoxysilane, when used in these proportions, can enhance the weather resistance. The polycondensate may further contain 0 mol % to 55 mol % of a dialkoxysilane.

The disclosure also relates to an aqueous dispersion containing a particulate resin composite that contains a fluorine-containing resin and an inorganic polymer, the inorganic polymer being segregated on a particle surface of the resin composite (hereinafter, such an aqueous dispersion is also referred to as a "second aqueous dispersion of the disclosure").

The particulate resin composite is preferably in the form of particles which are formed from a fluorine-containing resin and on the surfaces of which an inorganic polymer is segregated.

Also, the particulate resin composite contains a fluorine-containing resin and an inorganic polymer in one and the same particle. In other words, the particulate resin composite preferably contains the inorganic polymer in each particle.

The resin composite preferably has a core-shell structure consisting of a resinous core formed from a fluorine-containing resin (preferably, a fluoropolymer and a (meth)acrylic polymer) and a shell formed from an inorganic polymer. The shell portion of the resin composite preferably has a thickness of 5.0 nm or more, more preferably 10 nm or more, still more preferably 20 nm or more. The upper limit of the thickness of the shell portion is not limited, and may be 40 nm.

The thickness of the shell portion can be measured using, for example, a scanning transmission electron microscope.

The inorganic polymer is a polymer whose skeleton is formed from an inorganic element. Examples of the inorganic element include silicon (Si), titanium (Ti), aluminum (Al), and zirconium (Zr). The inorganic element is preferably Si. The inorganic polymer is more preferably a polysiloxane. Any polysiloxane mentioned for the first aqueous dispersion of the disclosure can be used as appropriate.

Segregation of the inorganic polymer on the surface of each resin composite particle can be confirmed by, for example, determining the intensity ratio between inorganic atoms and fluorine atoms by the semiquantitative method using a transmission electron microscope.

For example, in the case where the inorganic polymer is a polysiloxane, the resin composite preferably has an intensity ratio between silicon atoms and fluorine atoms ((intensity of silicon atoms in particle portion−intensity of silicon atoms in portion without particles (Blank))/(intensity of fluorine atoms in particle portion−intensity of fluorine atoms in portion without particles (Blank)), as determined by the semiquantitative method using a transmission electron microscope, of 0.15 or higher.

The intensity ratio (silicon atoms/fluorine atoms) is more preferably 0.3 or higher, still more preferably 0.4 or higher, particularly preferably 0.5 or higher, while preferably 1.0 or lower, more preferably 0.9 or lower, still more preferably 0.8 or lower.

The intensity ratio can be determined by the same method as that described for the first aqueous dispersion.

Preferred features of the fluorine-containing resin in the second aqueous dispersion of the disclosure are the same as those in the first aqueous dispersion of the disclosure described above, and any mode described for the first aqueous dispersion of the disclosure may be employed as appropriate. The fluorine-containing resin may consist only of a fluoropolymer or may be a mixture of a fluoropolymer and a polymer other than a fluoropolymer, such as a mixture of a fluoropolymer and a (meth)acrylic polymer.

Preferred modes of the fluoropolymer in the second aqueous dispersion of the disclosure are the same as those in the first aqueous dispersion of the disclosure described above, and any mode described for the first aqueous dispersion of the disclosure can be employed as appropriate. In the case where the fluorine-containing resin consists only of a fluoropolymer, the fluoropolymer preferably contains the hydrolyzable silyl group-containing unsaturated monomer unit and a fluoroolefin unit. The fluoropolymer may optionally contain a non-fluorinated monomer unit copolymerizable with a fluoroolefin in addition to the fluoroolefin unit.

The (meth)acrylic polymer in the second aqueous dispersion of the disclosure preferably contains a (meth)acrylic monomer unit. Examples of the (meth)acrylic monomer are the same as those mentioned for the first aqueous dispersion of the disclosure, and any mode for the first aqueous dispersion of the disclosure can be employed as appropriate.

The (meth)acrylic polymer preferably contains a (meth)acrylic monomer unit and a hydrolyzable silyl group-containing unsaturated monomer unit. In the case where the (meth)acrylic polymer contains a (meth)acrylic monomer unit and a hydrolyzable silyl group-containing unsaturated monomer unit, preferred modes thereof are the same as those for the first aqueous dispersion of the disclosure.

The resin composite in each of the first and second aqueous dispersions of the disclosure preferably has a mass ratio (fluoropolymer/(meth)acrylic polymer) between the fluoropolymer and the (meth)acrylic polymer of 90/10 to 10/90, more preferably 80/20 to 20/80, still more preferably 75/25 to 25/75, yet more preferably 70/30 to 30/70, further preferably 65/35 to 35/65, particularly preferably 60/40 to 40/60. A mass ratio (fluoropolymer/(meth)acrylic polymer) falling within the range can lead to a coating film with better solvent resistance, antifouling properties, and adhesion to a base material. Too high a proportion of the fluoropolymer may cause reduced film-formability of the coating film, although it can enhance the antifouling properties of the coating film. Too high a proportion of the (meth)acrylic polymer may cause reduced weather resistance of the coating film, although it can enhance the film-formability of the coating film.

The amount of the inorganic polymer in the resin composite in each of the first and second aqueous dispersions of the disclosure is preferably 0.1% by mass or more, more preferably 1.0% by mass or more, still more preferably 2.0% by mass or more, particularly preferably 3.0% by mass or more, while preferably 20% by mass or less, more preferably 10% by mass or less, of the whole amount of the fluoropolymer and the (meth)acrylic polymer, which accounts for 100% by mass.

The inorganic polymer in an amount within the range can lead to a coating film with better adhesion to a base material.

The resin composite in each of the first and second aqueous dispersions of the disclosure preferably has an acid value of 1 to 20, more preferably 1 to 10, still more preferably 4 or higher. Too high an acid value may cause a coating film with poor adhesion and poor antifouling properties. An acid value of zero may cause an emulsion with poor stability.

The hydroxy value and the acid value can be calculated from the amounts of the monomers used to synthesize the resin composite.

The resin composite in each of the first and second aqueous dispersions of the disclosure preferably has a glass transition temperature (Tg) of 0° C. to 70° C., more preferably 10° C. to 60° C., still more preferably 20° C. to 50° C. Too low a glass transition temperature cause impaired antifouling properties of the coating film. Too high a glass transition temperature may cause impaired film-formability.

The resin composite in each of the first and second aqueous dispersions of the disclosure preferably has a particle size of 50 to 300 nm, more preferably 50 to 250 nm.

The mass ratio (fluorine-containing resin/inorganic polymer) between the fluorine-containing resin and the inorganic polymer in each of the first and second aqueous dispersions of the disclosure is preferably (99.5 to 90)/(0.1 to 20), more preferably (99 to 92)/(1 to 15), still more preferably (98 to 93)/(2 to 10), particularly preferably (97 to 92)/(3 to 10).

In the case where the fluorine-containing resin is a mixture of a fluoropolymer and a (meth)acrylic polymer, the mass ratio (fluoropolymer/(meth)acrylic polymer/inorganic polymer) between the fluoropolymer, the (meth)acrylic polymer, and the inorganic polymer is preferably (90 to 10)/(10 to 90)/(0.1 to 20), more preferably (80 to 20)/(20 to 80)/(1 to 15), still more preferably (70 to 30)/(30 to 70)/(2 to 10), particularly preferably (70 to 30)/(30 to 70)/(3 to 10). A mass ratio (A/B/C) within the range may lead to a coating film with better solvent resistance, antifouling properties, and adhesion to a base material. Too high a proportion of the inorganic polymer may cause reduced film-forming properties. Too low a proportion thereof may cause reduced adhesion.

The amount of the resin composite in each of the first and second aqueous dispersions of the disclosure is not limited, and can be, for example, 10 to 60% by mass.

The first and second aqueous dispersions of the disclosure may each optionally contain additives such as pH control agents, film-forming aids, curing agents, curing accelerators, curing retarders, pigments, antifreeze agents, fillers, defoamers, levelling agents, rheology control agents, pH control agents, preservatives, ultraviolet absorbers, antioxidants, delusterants, lubricants, and seaweed-proofing agents. However, the aqueous dispersion preferably contains no component such as a pigment or a filler in order to form a coating film with excellent transparency.

The first and second aqueous dispersions of the disclosure may each further contain a film-forming aid. The film-forming aid may be any of the commercially available film-forming agents. Specific examples thereof include polyhydric alcohol alkyl ethers and organic acid esters, such as dipropylene glycol-n-butyl ether, ethyleneglycol monoethyl ether, ethylene glycol monobutyl ether, diethylene glycol monobutyl ether, diethylene glycol diethyl ether, ethylene glycol mono-2-ethylhexyl ether, diethyl adipate, and 2,2,4-trimethylpentane-1,3-diol monoisobutyrate.

The first and second aqueous dispersions of the disclosure may each further contain a defoamer. Examples of the defoamer include organic defoamers such as silicone-containing defoamers, surfactants, polyethers, and higher alcohols.

The pH of each of the first and second aqueous dispersions of the disclosure is preferably brought to 7.0 or higher, more preferably to 7.5 or higher using a pH control agent. Examples of the pH control agent include ammonia water and amines.

The first and second aqueous dispersions of the disclosure may each further contain a curing agent. The curing agent is selected depending on the types of the fluoropolymer and the acrylic polymer. For example, isocyanate-containing curing agents, melamine resins, silicate compounds, and isocyanate group-containing silane compounds are preferably used for a hydroxy group-containing fluoropolymer. Also, amino-containing curing agents and epoxy-containing curing agents are usually used for a carboxyl group-containing fluoropolymer. Carbonyl group-containing curing agents, epoxy-containing curing agents, and acid anhydride-containing curing agents are usually used for an amino group-containing fluoropolymer.

The examples of the curing agent also include crosslinking agents containing at least one group selected from the group consisting of non-blocked polyisocyanate compounds, blocked polyisocyanate compounds, melamine resins, aziridine groups, carbodiimide groups, and oxazoline groups; and hydrazine derivatives.

Non-blocked polyisocyanate compounds have excellent curability at room temperature and excellent crosslinking reactivity.

A non-blocked polyisocyanate compound refers to a typical isocyanate compound other than blocked polyisocyanate compounds obtainable by a reaction of an alcohol or an oxime compound with an isocyanate compound.

The non-blocked polyisocyanate compound is preferably a non-blocked polyisocyanate compound modified with any of the polyethylene oxide compounds disclosed in documents such as JP H11-310700 A, JP H07-330861 A, and JP S61-291613 A.

Specific examples thereof include non-blocked aliphatic polyisocyanate compounds and non-blocked aromatic polyisocyanate compounds modified with a polyethylene oxide compound. Preferred among these are non-blocked aliphatic polyisocyanate compounds in terms of excellent weather resistance.

Examples of acyclic aliphatic polyisocyanate compounds among the non-blocked aliphatic polyisocyanate compounds include diisocyanates such as trimethylene diisocyanate, tetramethylene diisocyanate, 1,6-diisocyanatohexane (=hexamethylene diisocyanate), pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanate methyl caproate; and polyisocyanates such as lysine ester triisocyanate, 1,4,8-triisocyanatooctane, 1,6,11-triisocyanatoundecane, 1,8-diisocyanato-4-isocyanatomethyl octane, 1,3,6-triisocyanatohexane, and 2,5,7-trimethyl-1,8-diisocyanato-5-isocyanatomethyl octane.

Examples of alicyclic polyisocyanate compounds among the non-blocked aliphatic polyisocyanate compounds include diisocyanates such as 1,3-cyclopentene diisocyanate, 1,4-cyclohexane diisocyanate, 1,3-cyclohexane diisocyanate, 1-isocyanato-3,3,5-trimethyl-5-isocyanatomethyl-cyclohexane (=isophorone diisocyanate), 4,4'-methylene bis(cyclohexylisocyanate), methyl-2,4-cyclohexane diisocyanate, methyl-2,6-cyclohexane diisocyanate, and 1,3- or 1,4-bis(isocyanatomethyl)cyclohexane; and polyisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the non-blocked aliphatic polyisocyanate compound include tolylene diisocyanate.

These isocyanate compounds may be used alone or two or more of these may be used in combination.

Examples of the polyethylene oxide compound, which is a modifier, include compounds known as nonionic emulsifiers, including polyoxyethylene alkyl ethers such as polyoxyethylene C8-C24 alkyl ethers, preferably polyoxyethylene C10-C22 alkyl ethers, particularly polyoxyethylene C12-C18 alkyl ethers, including polyoxyethylene monooctyl ether, polyoxyethylene monolauryl ether, polyoxyethylene monodecyl ether, polyoxyethylene monocetyl ether, polyoxyethylene monostearyl ether, and polyoxyethylene monooleyl ether; polyoxyethylene monoalkylaryl ethers such as polyoxyethylene C8-C12 alkyl-C6-C12 aryl ethers, including polyoxyethylene monooctylphenyl ether, polyoxyethylene monononylphenyl ether, and polyoxyethylene monodecylphenyl ether; polyoxyethylene sorbitan higher fatty acid esters such as polyoxyethylene sorbitan-mono, di, or tri C10-C24 fatty acid esters, including polyoxyethylene sorbitan monolaurate, polyoxyethylene sorbitan monostearate, polyoxyethylene sorbitan monooleate, polyoxyethylene sorbitan distearate, and polyoxyethylene sorbitan tristearate; and polyoxyethylene mono higher fatty acid esters such as polyoxyethylene mono C10-C24 fatty acid esters, including polyoxyethylene monolauric acid esters and polyoxyethylene monostearic acid esters. These compounds may be used alone or two or more of these may be used in combination. Preferred among these are polyoxyethylene C8-C24 alkyl ethers and polyoxyethylene C8-C12 alkyl phenyl ethers because they are easily dispersed in water.

Modification can be performed by, for example, mixing a polyisocyanate compound with a modifier in a solution and heating the mixture for reaction.

The ratio between the polyisocyanate compound and the modifier can be about 0.01 to 0.034 equivalents, preferably about 0.015 to 0.03 equivalents, of active hydrogen atoms in the modifier per equivalent of the isocyanate group in the polyisocyanate compound.

Non-limiting examples of commercially available products of the polyethylene oxide-modified non-blocked polyisocyanate compounds include Bayhydur 3100 and Bayhydur TPLS2150 available from Sumitomo Bayer Urethane Co., Ltd.; and Duranate WB40-100 available from Asahi Kasei Chemicals Corporation.

The non-blocked polyisocyanate compounds are typically used in the form of an aqueous solution or an aqueous dispersion.

Examples of the blocked polyisocyanate compounds include known curing agents such as Sumidur BL3175 available from Sumika Bayer Urethane Co., Ltd. and Duranate TPA-B80E available from Asahi Kasei Chemicals Corporation.

Examples of the cross-linking agent containing an aziridine group include XAMA2 and XAMA7 available from BF-Goodrich.

Examples of the cross-linking agent containing a carbodiimide group include UCARLNK Crosslinker XL-29SE available from Union Carbide Corporation, and Carbodilite E-02, E-04, SV-02, V-02V-02-L2, V-04, and V-10 available from Nisshinbo Chemical Inc.

Examples of the cross-linking agent containing an oxazoline group include Epocros K-1010E, Epocros K-1020E, Epocros K-1030E, Epocros K-2010E, Epocros K-2020E, Epocros K-2030E, and Epocros WS-500 available from Nippon Shokubai Co., Ltd.

The hydrazine derivative contains at least two hydrazine residues, and may be advantageously one derived from a saturated fatty acid dicarboxylic acid. Particularly important are aliphatic carboxylic acid dihydrazides having 2 to 10 carbon atoms. Preferred dihydrazides among these are malonic acid dihydrazide, succinic acid dihydrazide, glutaric acid dihydrazide, adipic acid dihydrazide, and/or sebacic acid dihydrazide. Examples include carbonic acid polyhydrazide such as carbonic acid dihydrazide.

The curing agent is preferably added in an amount of 0.1 to 5 molar equivalents, more preferably 0.5 to 1.5 molar equivalents, per equivalent of a curable functional group in the resin.

The amount of the curable functional group in the resin can be calculated by any combination use of NMR, FT-IR, elemental analysis, X-ray fluorescence analysis, and neutralization titration as appropriate for the types of the monomers.

Examples of the curing accelerator include organotin compounds, acidic phosphoric acid esters, reaction products of an acidic phosphoric acid ester and an amine, saturated or unsaturated polycarboxylic acids and anhydrides thereof, organic titanate compounds, amine-based compounds, and lead octylate.

The curing accelerators may be used alone or two or more of these may be used in combination. The amount of the curing accelerator to be added is preferably $1.0\times10^{-6}$ to $1.0\times10^{-2}$ parts by mass, more preferably about $5.0\times10^{-5}$ to $1.0\times10^{-3}$ parts by mass, relative to 100 parts by mass of the resin.

The viscosity of each of the first and second aqueous dispersions of the disclosure is described. Although being different for different applications, the viscosity is preferably, in general, 1000 mPa·s or lower at 25° C. when the solids concentration is 49 to 51% by mass. A viscosity in the range allows the dispersions to have better handleability. The viscosity is more preferably 500 mPa·s or lower, still more preferably 100 mPa·s or lower.

The viscosity is a value measured at 25° C. on 100 mL of an aqueous dispersion using a B-type viscometer.

The first and second aqueous dispersions of the disclosure can be appropriately produced by, for example, a method including: seed polymerizing a (meth)acrylic monomer and a hydrolyzable silyl group-containing unsaturated monomer in an aqueous dispersion containing a fluoropolymer; and polycondensing a silanol in the presence of a (meth)acrylic polymer obtained by the seed polymerization. The disclosure also relates to the above production method.

The seed polymerization enables production of a dispersion that contains particles containing a fluoropolymer and a (meth)acrylic polymer.

The seed polymerization can be performed by adding a (meth)acrylic monomer, a hydrolyzable silyl group-containing unsaturated monomer, and optionally another monomer into an aqueous dispersion containing a fluoropolymer. For example, a method may be employed which includes dropping an emulsion containing a (meth)acrylic monomer, a hydrolyzable silyl group-containing unsaturated monomer, a surfactant, and water into an aqueous dispersion containing a fluoropolymer.

The aqueous dispersion contains water, and may contain an organic solvent such as an alcohol, a glycol ether, or an ester, as well as water.

The temperature for the seed polymerization is not limited as long as the polymerization reaction proceeds, and is preferably 50° C. or higher, more preferably 60° C. or higher, still more preferably 70° C. or higher. Meanwhile, the temperature is preferably lower than 100° C., preferably 95° C. or lower, more preferably 90° C. or lower, because the seed polymerization is preferably performed at ordinary pressure.

The polymerization initiator for the seed polymerization can be an oil-soluble peroxide or a water-soluble radical polymerization initiator, for example. Typical polymerization initiators are oil-soluble initiators, including peroxy carbonates such as diisopropyl peroxydicarbonate (IPP) and di-n-propyl peroxydicarbonate (NPP). The peroxy carbonates, unfortunately, are explosion hazards, expensive, and likely to cause buildup of scale on the wall surface of a polymerization vessel during the polymerization reaction. In order to further reduce the compression set of the fluoropolymer, a water-soluble radical polymerization initiator is preferably used. Preferred examples of the water-soluble radical polymerization initiator include ammonium salts, potassium salts, and sodium salts of persulfuric acid, perboric acid, perchloric acid, perphosphoric acid, or percarbonic acid. In particular, ammonium persulfate and potassium persulfate are preferred.

The amount of the polymerization initiator to be added is not limited. An amount thereof that does not significantly lower the polymerization rate (e.g., several ppm relative to water) or more may be added at once, in portions, or continuously in the initial stage of the polymerization. The upper limit of the amount is set such that the heat of polymerization reaction can be removed from the surface of a polymerization vessel.

In the seed polymerization, an additive such as a molecular weight modifier may be further added. The molecular weight modifier may be added at once, in portions, or continuously in the initial stage. Preferred examples of the molecular weight modifier include halogenated hydrocarbons (e.g., chloroform, carbon tetrachloride) and mercaptans (e.g., n-dodecyl mercaptan, t-dodecyl mercaptan, n-octyl mercaptan). The amount of the molecular weight modifier used is typically about 0 to 5.0 parts by weight relative to 100 parts by weight of a (meth)acrylic monomer.

In the seed polymerization, the aqueous dispersion containing a fluoropolymer preferably contains 30 to 60% by mass of the fluoropolymer relative to the whole amount of the aqueous dispersion.

The seed polymerization can be performed by adding 30 to 300% by mass of a (meth)acrylic monomer and 1 to 40% by mass of a hydrolyzable silyl group-containing unsaturated monomer to 100% by mass of the fluoropolymer. More preferably, 60 to 150% by mass of a (meth)acrylic monomer and 5 to 20% by mass of a hydrolyzable silyl group-containing unsaturated monomer are added.

The seed polymerization is preferably performed in the presence of a surfactant such as a nonreactive anionic surfactant, a reactive anionic surfactant, a nonreactive nonionic surfactant, or a reactive nonionic surfactant.

The seed polymerization is preferably performed in the presence of at least one selected from the group consisting of a reactive anionic surfactant and a reactive nonionic surfactant, more preferably in the presence of a reactive anionic surfactant.

Examples of the reactive anionic surfactant include compounds (3) represented by

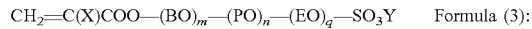 Formula (3):

(wherein X is H or $CH_3$; BO is a butylene oxide unit; PO is a propylene oxide unit; EO is a $CH_2CH_2O$ or $CH(CH_3)O$ unit; m is an integer of 0 to 50; n is an integer of 0 to 100; q is an integer of 0 to 100; m+n+q is an integer of 10 to 150; and Y is $NH_4$ or an alkali metal), and compounds (4) represented by

 Formula (4):

(wherein $R^1$ is a hydrocarbon chain that optionally contains an oxygen atom and/or a nitrogen atom; and X is $SO_3Y$, where Y is $NH_4$ or an alkali metal).

$R^1$ in Formula (4) is a hydrocarbon chain optionally containing an oxygen atom and/or a nitrogen atom.

$R^1$ is preferably a hydrocarbon group containing an oxyalkylene group.

X is $SO_3Y$ (Y is $NH_4$ or an alkali metal). The alkali metal is preferably Na or K.

Examples of the oxyalkylene group include C2-C4 linear or branched oxyalkylene groups such as ethylene oxide, propylene oxide, and butylene oxide.

Preferred examples of the compounds represented by Formula (4) include compounds (4a) represented by Formula (4a):

[Chem. 5]

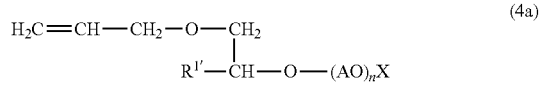

(4a)

wherein $R^{1'}$ is a linear or branched hydrocarbon chain optionally containing an oxygen atom, a phenyl group, or a phenylene group; AO is a C2-C4 linear or branched oxyalkylene group; n is an integer of 1 to 100; and X is $SO_3Y$ (Y is $NH_4$ or an alkali metal atom).

The number of carbon atoms of $R^{1'}$ is preferably 1 to 51, more preferably 5 to 21, still more preferably 10 to 16.

In the formula, n is preferably an integer of 1 to 60, more preferably an integer of 5 or greater, still more preferably an integer of 10 or greater, while more preferably an integer of 30 or smaller, still more preferably an integer of 20 or smaller, particularly preferably an integer of 15 or smaller.

The alkali metal atom is preferably Na or K.

Preferred examples of the compounds represented by Formula (4a) include compounds (4a-1) represented by Formula (4a-1):

[Chem. 6]

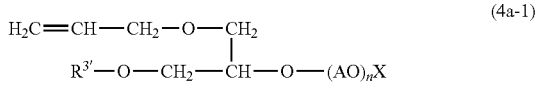

(4a-1)

(wherein R3' is a linear or branched C1-C50 hydrocarbon chain optionally containing a phenyl group or a phenylene group; AO is a C2-C4 linear or branched oxyalkylene group; n is an integer of 1 to 100; X is $SO_3Y$ (Y is $NH_4$ or an alkali metal atom such as Na or K) and compounds (4a-2) represented by Formula (4a-2);

[Chem. 7]

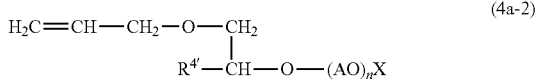

(4a-2)

(wherein R4' is a C1-C50 alkyl group; AO is a C2-C4 linear or branched oxyalkylene group; n is an integer of 1 to 100; X is $SO_3Y$ (Y is $NH_4$ or an alkali metal atom such as Na or K).

In Formula (4a-1), the number of carbon atoms of R3' is 1 to 50, preferably 5 to 20, more preferably 10 to 15. In the formula, n is an integer of 1 to 100, preferably an integer of 1 to 60, more preferably an integer of 5 to 30, still more preferably an integer of 10 to 15, in terms of dispersion stability and water resistance.

X is preferably $SO_3NH_4$.

AO is preferably ethylene oxide.

Examples of commercially available products of the compounds (4a-1) include Adeka Reasoap SE series and SR series (both available from Adeka Corporation).

In Formula (4a-2), R4' is a C1-C50 alkyl group, preferably a C5-C20 alkyl group, more preferably a C10-C15 alkyl group. In the formula, n is an integer of 1 to 100, preferably an integer of 1 to 20, more preferably an integer of 5 to 15, in terms of dispersion stability and water resistance.

X is preferably $SO_3NH_4$.

AO is preferably ethylene oxide.

Examples of commercially available products of the compounds (4a-2) include Aqualon KH-10 (available from DKS Co. Ltd.).

The amount of the reactive anionic surfactant to be added in the seed polymerization relative to 100 parts by mass of the seed particles is preferably 0.15 to 100 parts by mass, more preferably 1 part by mass or more, still more preferably 2 parts by mass or more, while more preferably 50 parts by mass or less, still more preferably 10 parts by mass or less.

The polycondensation can be performed by adding an organosilane to the aqueous dispersion containing a fluoropolymer and an acrylic polymer obtained from the seed polymerization.

The organosilane is hydrolyzed in the aqueous dispersion into a silanol compound, which is then polycondensed.

The polycondensation preferably includes adding 0.5 to 20% by mass of an organosilane to a total of 100% by mass of a fluoropolymer and an acrylic polymer. More preferably, the amount to be added is 2.5 to 10% by mass.

The temperature for the polycondensation is not limited as long as the polycondensation proceeds, and is preferably 50° C. or higher, more preferably 60° C. or higher, still more preferably 70° C. or higher. Meanwhile, the temperature is preferably lower than 100° C., preferably 95° C. or lower, more preferably 90° C. or lower.

The polycondensation is preferably performed after polymerization of the acrylic monomer, i.e., after the seed polymerization.

The polycondensation is preferably performed under acidic conditions. The polycondensation under the acidic conditions enables efficient production of a resin composite that contains an inorganic polymer segregated on the surface of each particle of the emulsion obtained in the seed polymerization.

The polycondensation is preferably performed at a pH of 1 to 6, more preferably at a pH of 2 to 5.

In the production method of the disclosure, the seed polymerization and the polycondensation are preferably performed successively at a maintained temperature of 50° C. or higher. The temperature is preferably 60° C. or higher, more preferably 70° C. or higher. If the polycondensation is performed by dropping the temperature to lower than 50° C. after the seed polymerization and raising the temperature again, the resulting aqueous dispersion may have a high viscosity.

In terms of productivity, the polycondensation is preferably performed at the same temperature as that in the seed polymerization.

The production method may include aqueous dispersion polymerization of a fluoroolefin to provide an aqueous dispersion containing a fluoropolymer. In other words, the production method of the disclosure also preferably includes: providing an aqueous dispersion containing a fluoropolymer through aqueous dispersion polymerization of a fluoroolefin; seed polymerizing a (meth)acrylic monomer and a hydrolyzable silyl group-containing unsaturated monomer in the aqueous dispersion containing a fluoropolymer; and polycondensing a silanol in the presence of a (meth)acrylic polymer obtained by the seed polymerization.

The aqueous dispersion in the aqueous dispersion polymerization contains water. The aqueous dispersion may contain an organic solvent such as an alcohol, a glycol ether, or an ester, as well as water.

The aqueous dispersion polymerization can also be performed, if desired, in the presence of a surfactant such as a nonreactive anionic surfactant, a reactive anionic surfactant, a nonreactive nonionic surfactant, or a reactive nonionic surfactant. These surfactants may be those mentioned as examples for the seed polymerization as appropriate.

The first and second aqueous dispersions of the invention, produced by the method described above, may contain an alcohol generated in the polycondensation, i.e., methanol, ethanol, or both of these, as well as water.

The amount of the alcohol is 100 ppm or more, 1000 ppm or more, or 1% or more.

The aqueous dispersion is suitable for an aqueous coating material. The aqueous coating material is preferably an aqueous clear coating material. The aqueous dispersion may be applied by a conventionally known method under conventionally known conditions. For example, the dispersion is applied to a base material by, for example, spray coating, roll coating, flow coating, coating with a roller or brush, or gravure and screen printing, thereby forming a coating film. Then, the coating film is dried at 5° C. to 200° C. Such a method enables formation of a coating film with better solvent resistance, antifouling properties, and adhesion to a base material.

The disclosure also relates to a coating film obtained from each of the first and second aqueous dispersions. A coating film obtained from the aqueous dispersion is excellent in adhesion to a base material, and is also excellent in properties such as solvent resistance and antifouling properties.

The disclosure also relates to a coating film containing a particulate resin composite that contains an inorganic polymer segregated on a particle surface of the resin composite.

The coating film is preferably formed from an aggregate of particles of the particulate resin composite that contains the inorganic polymer segregated.

Figure 3:
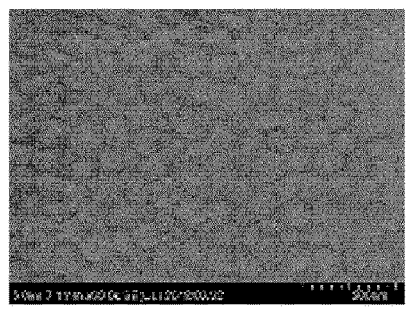
FIG. 3 is a secondary electron image obtained from SEM observation of the surface of a coating film obtained using an aqueous dispersion from Example 1.
Figure 5:
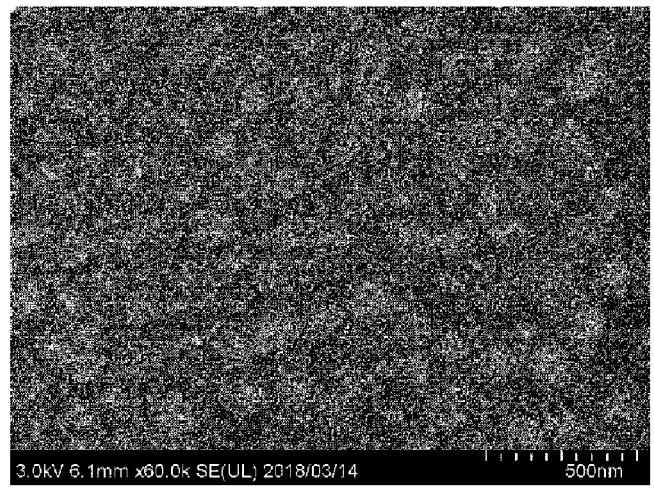
FIG. 5 is a secondary electron image obtained from SEM observation of the surface of a coating film obtained using an aqueous dispersion from Example 2.
Figure 7:
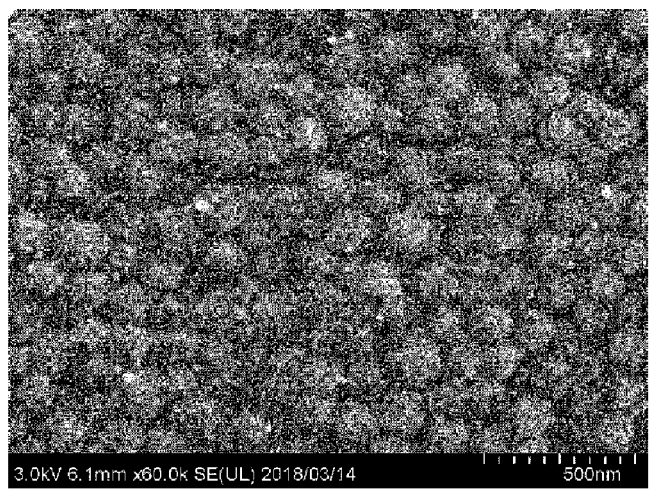
FIG. 7 is a secondary electron image obtained from SEM observation of the surface of a coating film obtained using an aqueous dispersion from Example 3.

The coating film of the disclosure preferably has a honeycomb structure in which the resin composite particles are aggregated. The honeycomb structure of the coating film of the disclosure can be confirmed by surface observation using a scanning electron microscope. For example, coating films obtained from the aqueous dispersions of Examples 1 to 3 described below have honeycomb structures as shown in FIGS. 3, 5, and 7, respectively.

The coating film of the disclosure preferably contains an inorganic polymer segregated on the surface. The segregation of the inorganic polymer on the coating film surface can be confirmed by a method such as XPS measurement.

The segregation can also be confirmed when the silicon atom/fluorine atom intensity ratio on the surface is higher than the silicon atom/fluorine atom intensity ratio inside the coating film.

The coating film of the disclosure preferably has a "silicon atom/fluorine atom intensity ratio on the surface", as determined by XPS, of 0.2 or higher. The intensity ratio is more preferably 0.3 or higher.

The silicon atom/fluorine atom intensity ratio inside the coating film is a silicon atom/fluorine atom intensity ratio determined by irradiating the surface with gas cluster ion beams for eight minutes under the following conditions for surface shaving, and exposing the shaved surface.

The XPS measurement can be performed under the following conditions.

[Silicon Atom/Fluorine Atom Intensity Ratio]
  Measurement conditions: X ray output 25 W 15 KV
  Sputtering conditions: GCIB 5 Kv 20 nA The surface of a produced coated plate is analyzed by XPS under the above conditions to measure the intensity of each element. The surface is then irradiated with gas cluster ion beams (GCIB) for two minutes for surface shaving, and thereby the shaved surface is exposed (the depth of the potion of PMMA shaved under the same conditions was 20 nm). The surface is then analyzed by XPS to measure the intensity of each element. These processes are repeated, so that the distribution of each element is determined.

The thickness of the coating film of the disclosure is not limited, and is typically 1 to 100 μm.

The disclosure also relates to a coated article obtainable by applying the aqueous dispersion to a base material.

The base material is preferably, but not limited to, a transparent base material. Specific examples of the transparent base material include plastic base materials such as polyethylene terephthalate, acrylic resin, polycarbonate resin, and fluororesin; metal base materials such as Galvalume® steel plates, ZAM steel plates, cold rolled steel plates, and aluminum; a base material made from glass; and transparent articles. In particular, a coating film formed by applying the aqueous dispersion to a base material made from a Galvalume® steel plate, a cold rolled steel plate, glass, or polyethylene terephthalate is excellent in weather resistance, solvent resistance, antifouling properties, and adhesion to the base material.

The coated article is usable for various applications such as the exterior and interior of electric appliances (e.g., microwave ovens, toasters, refrigerators, washing machines, hair dryers, TVs, VCRs, amplifiers, radios, electric pots, rice cookers, radio cassette players, cassette decks, CD players, video cameras, personal computers); the exterior and interior of indoor units, outdoor units, air outlets, and air ducts of air conditioners, and air conditioners such as air cleaners and heaters; lighting fixtures such as fluorescent lamps, chandeliers, and reflectors; furniture; machine components; decorations; combs; eyeglass frames; natural fibers; synthetic fibers (including threads and fabrics obtainable therefrom); the exterior and interior of office equipment (telephones, facsimiles, copying machines (including rolls), cameras, overhead projectors, projection cameras, clocks, slide projectors, desks, bookshelves, lockers, file cabinets, chairs, book ends, electric white boards); coats of automobiles (wheels, door mirrors, moldings, door knobs, license plates, steering wheels, instrument panels) and cooking utensils (range hoods, kitchen sinks, kitchen tables, kitchen knives, cutting boards, water outlets, gas stoves, exhaust fans); coats of the building interior, such as partitions, bath units, shutters, window blinds, curtain rails, accordion curtains, walls, ceilings, and floors; coats of the house exterior and the building exterior such as outer walls, balustrades, gates, and shutters; exterior finishing materials for buildings such as ceramic sizing materials, foamed concrete panels, concrete panels, aluminum curtain walls, steel plates, zinc galvanized steel plates, stainless steel plates, PVC sheets, PET films, polycarbonates, and acrylic films; siding materials; windowpanes; tents; and backsheet films, frontsheet films, and mounting bases for solar cells.

EXAMPLES

The invention is described based on examples and comparative examples. The invention is not limited to the examples.

The devices and measurement conditions used for the evaluation of the characteristics are as follows.
(1) Initial Water Resistance Test A test coated plate was immersed in 60° C. water for 12 hours. The temperature of water was decreased to 5° C. The coated plate was then quickly taken out from the water chamber and dried in a 5° C. constant temperature chamber for two hours. In accordance with JIS K5600-4-5, the color of the test coated plate was measured in the L*a*b* color space using a color difference meter available from Nippon Denshoku Industries Co., Ltd. to determine the color difference ΔL. From the magnitude of the color difference before and after the test on the test coated plate, the white turbidity level was evaluated.
(2) Evaluation Criteria of White Turbidity Level The magnitude of the color difference ΔL before and after the test was evaluated based on the following criteria.
  Good: less than 2
  Fair: 2 or more and less than 5
  Poor: 5 or more
(3) XPS Measurement
  Device: VersaProbe II available from Ulvac-Phi, Inc.
  Measurement conditions: X ray output 25 W 15 KV
  Sputtering conditions: GCIB 5 Kv 20 nA The surface of the produced coated plate is analyzed by XPS under the above conditions to measure the intensity of each element.

The surface is then irradiated with gas cluster ion beams (GCIB) for two minutes for surface shaving, and thereby the shaved surface is exposed. The depth of the potion of PMMA shaved under the same conditions was 20 nm. The surface is analyzed by XPS to measure the intensity of each element.

These processes are repeated, so that the distribution of each element is determined.

The Si/F intensity ratio was calculated from the intensity data of the elements.

(4) SEM Measurement

Device: FE-SEM SU8020 available from Hitachi, Ltd.

Accelerating voltage: 3 Kv

The surface of the produced coated plate was coated with Pt to make the surface conductive. The surface was then subjected to SEM measurement using the above device.

(5) EDX Measurement

Device: BRUKER XFlash6160

Accelerating voltage: 15 Kv

The measurement time for elemental mapping was 200 seconds.

(6) TEM Measurement

Device: scanning transmission electron microscope (Talos F200X available from FEI Company Japan Ltd.)

One part by weight of each of the aqueous dispersions of the examples and the comparative examples was diluted with 5000 parts by weight of pure water. The resulting dilution was sprayed on a transmission electron microscope observation mesh sheet on which a thin film was formed. The dilution was dried, so that particles to be subjected to semiquantitative analysis adhered to the mesh sheet. In order to prevent charging, the mesh sheet was coated with osmium to a film thickness of about 5 nm in an osmium coater (Neoc-Pro neo osmium coater available from Meiwafosis Co., Ltd.) under the following film-forming conditions: a degree of vacuum of 2 Pa, and a time of 10 seconds.

The particles on the mesh sheet sample were subjected to STEM observation using a scanning transmission electron microscope (Talos F200X available from FEI Company Japan Ltd.) at an observation magnification of ×225000 and an image size of 1024×1024 pixels. The sample was scanned 58 times with an accelerating voltage of 200 kV and a scanning time of 609 seconds. Simultaneously with the STEM observation, the sample was scanned 29 times with a scanning time of 609 seconds for elemental mapping using an energy-dispersive X-ray spectroscope (Super-X available from FEI Company Japan Ltd.). Based on the obtained data, semiquantitative analysis of the elements, namely fluorine and silicon was performed, in a portion with particles and in a portion without particles using image analysis software (ESPRIT 1,9 available from Bruker BioSpin). The portion without particles selected was a portion near the particles in the same photograph, and the measurement was performed with the same measurement area. Using the intensity of each element, the Si/F intensity ratio was calculated from the following formula.

Silicon atom/fluorine atom=(intensity of silicon atom in portion with particles (Particles)−intensity of silicon atom in portion without particles (Blank))/(intensity of fluorine atom in portion with particles (Particles)−intensity of fluorine atom in portion without particles (Blank))

(7) Viscosity Measurement

A 100-mL portion of each of the aqueous dispersions of the examples and the comparative examples was subjected to measurement at 25° C. using a B-type viscometer.

(8) Adhesion Test

Each of the aqueous dispersions of the examples and the comparative examples was applied to a glass plate and an aluminum plate using a bar coater #10. The dispersion was dried at 100° C. for 10 minutes, so that a coating film was obtained. The coating film was cut using a utility knife at 2 mm intervals to make 25 cells of a grid with six vertical cuts and six horizontal cuts. A tape peeling test was performed in accordance with the cross-hatch tape method (JIS K5400).

All the cells were peeled (0/25): poor

No cells were peeled (25/25): good

One or more cells were peeled (1 to 24/25): fair

Example 1: Synthesis of Composite Polymer Particles

A 2-L glass four-neck separable flask equipped with a stirrer, a reflux pipe, a thermometer, and a dropping funnel was charged with 717 parts by mass of an aqueous dispersion of VdF/TFE/CTFE polymer (VdF/TFE/CTFE=72/15/13 (mol %)) particles, 112 parts by mass of methyl methacrylate (MMA), 115 parts by mass of n-butyl acrylate (BA), 0.03 parts by mass of n-butyl methacrylate (BMA), 0.03 parts by mass of cyclohexyl methacrylate (CHMA), 0.03 parts by mass of 2-hydroxyethyl methacrylate (2-HEMA), 5.3 parts by mass of methacrylic acid, 1.8 parts by mass of γ-methacryloxypropyl trimethoxysilane, 100 g of water, and 12.5 parts by mass of polyoxyethylene-1-(allyloxymethyl) alkyl ether sulfate ammonium salt. The mixture was heated with stirring. When the temperature of the flask reached 80° C., addition of a polymerization initiator was started. The polymerization initiator was dropped over two hours for polymerization. After the dropping ended, the mixture was stirred at 80° C. for two hours.

To the mixture was then dropped 62 parts by mass of trimethoxymethylsilane and 0.6 parts by mass of tetraethoxysilane at 80° C. over 0.5 hours, followed by stirring for one hour. The mixture was cooled to room temperature to end the reaction, and then neutralized to a pH of 8.0 using a pH control agent. Thereby, an aqueous dispersion of composite polymer particles of a fluoropolymer, a (meth)acrylic polymer, and a siloxane polymer was obtained. The mass ratio (A/B/C) between the fluoropolymer (A), the (meth)acrylic polymer (B), and the siloxane polymer (polysiloxane) (C) was 50/45/5.

Figure 16:
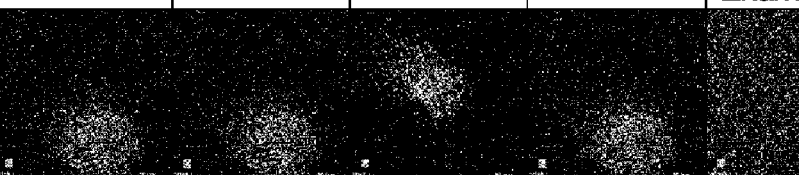
FIG. 16 includes photographs each obtained from TEM measurement of an aqueous dispersion from an example or a comparative example by a semiquantitative method.

A TEM measurement mesh sheet sample was produced using the aqueous dispersion through the process described above. The produced mesh sheet sample was subjected to TEM measurement, and a photograph obtained is shown in FIG. 15. A photograph obtained by TEM measurement on the mesh sheet sample by the semiquantitative method is shown in FIG. 16.

The amount of the siloxane polymer was calculated from the following formula based on the calculation method of the amount equivalent to a hydrolysis condensate disclosed in JP 2016-000808 A. The amount was calculated using the amounts of trimethoxymethylsilane and tetraethoxysilane charged. The same applies to the following examples and comparative examples.

Total amount of siloxane polymer=amount of trimethoxymethylsilane charged×conversion factor for trimethoxymethylsilane+amount of tetraethoxysilane charged×conversion factor for tetraethoxysilane Conversion factor for trimethoxymethylsilane: 0.493
Conversion factor for tetraethoxysilane: 0.288

Example 2: Synthesis of Composite Polymer Particles

A 2-L glass four-neck separable flask equipped with a stirrer, a reflux pipe, a thermometer, and a dropping funnel was charged with 731 parts by mass of an aqueous dispersion of VdF/TFE/CTFE polymer (VdF/TFE/CTFE=72/15/13 (mol %)) particles, 108 parts by mass of methyl methacrylate (MMA), 151 parts by mass of n-butyl acrylate (BA), 0.03 parts by mass of n-butyl methacrylate (BMA), 0.03 parts by mass of cyclohexyl methacrylate (CHMA), 0.03 parts by mass of 2-hydroxyethyl methacrylate (2-HEMA), 5.3 parts by mass of methacrylic acid, 1.8 parts by mass of γ-methacryloxypropyl trimethoxysilane, 100 g of water, and 12.5 parts by mass of polyoxyethylene-1-(allyloxymethyl)alkyl ether sulfate ammonium salt. The mixture was heated with stirring. When the temperature of the flask reached 80° C., addition of a polymerization initiator was started. The polymerization initiator was dropped over two hours for polymerization. After the dropping ended, the mixture was stirred at 80° C. for two hours.

To the mixture was then dropped 93 parts by mass of trimethoxymethylsilane and 0.9 parts by mass of tetraethoxysilane at 80° C. over 0.5 hours, followed by stirring for one hour. The mixture was cooled to room temperature to end the reaction, and then neutralized to a pH of 8.0 using a pH control agent. Thereby, an aqueous dispersion of composite polymer particles was obtained. The mass ratio (A/B/C) between the fluoropolymer (A), the (meth)acrylic polymer (B), and the siloxane polymer (polysiloxane) (C) was 50/42.5/7.5.

A photograph obtained by TEM measurement on the aqueous dispersion by the semiquantitative method is shown in FIG. 16.

Example 3: Synthesis of Composite Polymer Particles

A 2-L glass four-neck separable flask equipped with a stirrer, a reflux pipe, a thermometer, and a dropping funnel was charged with 744 parts by mass of an aqueous dispersion of VdF/TFE/CTFE polymer (VdF/TFE/CTFE=72/15/13 (mol %)) particles, 102 parts by mass of methyl methacrylate (MMA), 148 parts by mass of n-butyl acrylate (BA), 0.03 parts by mass of n-butyl methacrylate (BMA), 0.03 parts by mass of cyclohexyl methacrylate (CHMA), 0.03 parts by mass of 2-hydroxyethyl methacrylate (2-HEMA), 5.3 parts by mass of methacrylic acid, 1.8 parts by mass of γ-methacryloxypropyl trimethoxysilane, 100 g of water, and 12.5 parts by mass of polyoxyethylene-1-(allyloxymethyl)alkyl ether sulfate ammonium salt. The mixture was heated with stirring. When the temperature of the flask reached 80° C., addition of a polymerization initiator was started. The polymerization initiator was dropped over two hours for polymerization. After the dropping ended, the mixture was stirred at 80° C. for two hours.

To the mixture was then dropped 125 parts by mass of trimethoxymethylsilane and 1.2 parts by mass of tetraethoxysilane at 80° C. over 0.5 hours, followed by stirring for one hour. The mixture was cooled to room temperature to end the reaction, and then neutralized to a pH of 8.0 using a pH control agent. Thereby, an aqueous dispersion of composite polymer particles was obtained. The mass ratio (A/B/C) between the fluoropolymer (A), the (meth)acrylic polymer (B), and the siloxane polymer (polysiloxane) (C) was 50/40/10.

A photograph obtained by TEM measurement on the aqueous dispersion is shown in FIG. 15. A photograph obtained by TEM measurement on the aqueous dispersion by the semiquantitative method is shown in FIG. 16.

Example 4

A 2-L glass four-neck separable flask equipped with a stirrer, a reflux pipe, a thermometer, and a dropping funnel was charged with 710 parts by mass of an aqueous dispersion of VdF/TFE/CTFE polymer (VdF/TFE/CTFE=72/15/13 (mol %)) particles, 126 parts by mass of methyl methacrylate (MMA), 167 parts by mass of n-butyl acrylate (BA), 0.03 parts by mass of n-butyl methacrylate (BMA), 0.03 parts by mass of cyclohexyl methacrylate (CHMA), 0.03 parts by mass of 2-hydroxyethyl methacrylate (2-HEMA), 5.5 parts by mass of methacrylic acid, 1.8 parts by mass of γ-methacryloxypropyl trimethoxysilane, 100 g of water, and 12.5 parts by mass of polyoxyethylene-1-(allyloxymethyl)alkyl ether sulfate ammonium salt. The mixture was heated with stirring. When the temperature of the flask reached 80° C., addition of a polymerization initiator was started. The polymerization initiator was dropped over two hours for polymerization. After the dropping ended, the mixture was stirred at 80° C. for two hours.

To the mixture was then dropped 31 parts by mass of trimethoxymethylsilane and 0.3 parts by mass of tetraethoxysilane at 80° C. over 0.5 hours, followed by stirring for one hour. The mixture was cooled to room temperature to end the reaction, and then neutralized to a pH of 8.0 using a pH control agent. Thereby, an aqueous dispersion of composite polymer particles was obtained. The mass ratio (A/B/C) between the fluoropolymer (A), the (meth)acrylic polymer (B), and the siloxane polymer (polysiloxane) (C) was 50/47.5/2.5.

A photograph obtained by TEM measurement on the aqueous dispersion by the semiquantitative method is shown in FIG. 16.

Comparative Example 1

A 2-L glass four-neck separable flask equipped with a stirrer, a reflux pipe, a thermometer, and a dropping funnel was charged with 710 parts by mass of an aqueous dispersion of VdF/TFE/CTFE polymer (VdF/TFE/CTFE=72/15/13 (mol %)) particles, 126 parts by mass of methyl methacrylate (MMA), 167 parts by mass of n-butyl acrylate (BA), 0.03 parts by mass of n-butyl methacrylate (BMA), 0.03 parts by mass of cyclohexyl methacrylate (CHMA), 0.03 parts by mass of 2-hydroxyethyl methacrylate (2-HEMA), 5.5 parts by mass of methacrylic acid, 100 g of water, and 12.5 parts by mass of polyoxyethylene-1-(allyloxymethyl)alkyl ether sulfate ammonium salt. The mixture was heated with stirring. When the temperature of the flask reached 80° C., addition of a polymerization initiator was started. The polymerization initiator was dropped over two hours for polymerization. After the dropping ended, the mixture was stirred at 80° C. for two hours. The mixture was cooled to room temperature to end the reaction, and then neutralized to a pH of 8.0 using a pH control agent. Thereby, an aqueous dispersion of composite polymer particles was obtained. The mass ratio (A/B) between the fluoropolymer (A) and the (meth)acrylic polymer (B) was 50/50.

A photograph obtained by TEM measurement on the aqueous dispersion by the semiquantitative method is shown in FIG. 16.

Comparative Example 2

To the aqueous dispersion obtained in Comparative Example 1 were dropped 62 parts by mass of trimethoxymethylsilane and 0.6 parts by mass of tetraethoxysilane with stirring at room temperature over 0.5 hours, followed by stirring for one hour. Thereby, an aqueous dispersion was obtained.

A photograph obtained by TEM measurement on the aqueous dispersion by the semiquantitative method is shown in FIG. 16.

Comparative Example 3

To the aqueous dispersion obtained in Comparative Example 1 were dropped 62 parts by mass of trimethoxymethylsilane and 0.6 parts by mass of tetraethoxysilane with stirring at room temperature over 0.5 hours, followed by stirring for one hour. The mixture was then heated in a water bath with stirring. When the temperature of the flask reached 80° C., the mixture was stirred for two hours. The mixture was cooled to room temperature to end the reaction, whereby an aqueous dispersion was obtained.

A photograph obtained by TEM measurement on the aqueous dispersion by the semiquantitative method is shown in FIG. 16.

Comparative Example 4

A 2-L glass four-neck separable flask equipped with a stirrer, a reflux pipe, a thermometer, and a dropping funnel was charged with 710 parts by mass of an aqueous dispersion of VdF/TFE/CTFE polymer (VdF/TFE/CTFE=72/15/13 (mol %)) particles, 126 parts by mass of methyl methacrylate (MMA), 167 parts by mass of n-butyl acrylate (BA), 0.03 parts by mass of n-butyl methacrylate (BMA), 0.03 parts by mass of cyclohexyl methacrylate (CHMA), 0.03 parts by mass of 2-hydroxyethyl methacrylate (2-HEMA), 5.5 parts by mass of methacrylic acid, 1.8 parts by mass of γ-methacryloxypropyl trimethoxysilane, 100 g of water, and 12.5 parts by mass of polyoxyethylene-1-(allyloxymethyl)alkyl ether sulfate ammonium salt. The mixture was heated with stirring. When the temperature of the flask reached 80° C., addition of a polymerization initiator was started. The polymerization initiator was dropped over two hours for polymerization. After the dropping ended, the mixture was stirred at 80° C. for two hours. The mixture was cooled to room temperature to end the reaction, and then neutralized to a pH of 8.0 using a pH control agent. Thereby, an aqueous dispersion of composite polymer particles was obtained. The mass ratio (A/B) between the fluoropolymer (A) and the (meth)acrylic polymer (B) was 50/50.

A photograph obtained by TEM measurement on the aqueous dispersion is shown in FIG. 15. A photograph obtained by TEM measurement on the aqueous dispersion by the semiquantitative method is shown in FIG. 16.

Example 5

To the aqueous dispersion obtained in Comparative Example 4 were dropped 62 parts by mass of trimethoxymethylsilane and 0.6 parts by mass of tetraethoxysilane with stirring at room temperature over 0.5 hours, followed by stirring for one hour. Thereby, an aqueous dispersion was obtained.

A photograph obtained by TEM measurement on the aqueous dispersion without washing is shown in FIG. 15. A photograph obtained by TEM measurement on the aqueous dispersion by the semiquantitative method is shown in FIG. 16

Example 6

To the aqueous dispersion obtained in Comparative Example 4 were dropped 62 parts by mass of trimethoxymethylsilane and 0.6 parts by mass of tetraethoxysilane with stirring at room temperature over 0.5 hours, followed by stirring for one hour. The mixture was heated in a water bath with stirring. When the temperature of the flask reached 80° C., the mixture was stirred for two hours. The mixture was cooled to room temperature to end the reaction, whereby an aqueous dispersion was obtained.

A photograph obtained by TEM measurement on the aqueous dispersion is shown in FIG. 15. A photograph obtained by TEM measurement on the aqueous dispersion by the semiquantitative method is shown in FIG. 16.

Example 7

Polymerization was performed as in Example 4 except that the amounts were changed as follows: 512 parts by mass of the aqueous dispersion of the VdF/TFE/CTFE polymer particles, 124 parts by mass of methylmethacrylate (MMA), 60 parts by mass of n-butylacrylate (BA), 145 parts by mass of n-butylmethacrylate (BMA), 12 parts by mass of cyclohexylmethacrylate (CHMA), 19 parts by mass of 2-hydroxyethylmethacrylate (2-HEMA), and 11 parts by mass of methacrylic acid. Thereby, an aqueous dispersion of composite polymer particles having a mass ratio (A/B/C) between the fluoropolymer (A), the (meth)acrylic polymer (B), and the siloxane polymer (C) of 35/60/5.

[Production of Coated Plate for Initial Water Resistance Test]

A chromate-treated aluminum plate (obtained by coating the plate with a primer having the following composition to a wet film thickness of 90 g/m$^2$ and drying overnight at room temperature) preheated to 60° C. was coated with a clear coating composition having the following composition using a bar coater #30, followed by drying at 100° C. for three minutes using a fan dryer. Thereby, a test coated plate was produced.

The initial water resistance of the test coated plate was determined. Table 1 shows the results.

(Primer Formulation)

| | |
|---|---|
| Base emulsion | 92.90 parts by mass |
| Pigment | 4.66 parts by mass |
| Film-forming aid | 2.14 parts by mass |
| Defoamer | 0.30 parts by mass |

The materials used are as follows.
Base emulsion: Movinyl DM774 available from The Nippon Synthetic Chemical Industry Co., Ltd.
Pigment: Liofast Black M232 available from Toyocolor Co., Ltd.
Defoamer: BYK-028 available from BYK Japan KK
Film-forming aid: Texanol available from Eastman Chemical Company
(Clear Coating Composition Formulation)

| | |
|---|---|
| Aqueous dispersion obtained in example or comparative example | 97.50 parts by mass |
| Film-forming aid | 2.44 parts by mass |
| pH control agent | 0.06 parts by mass |

The materials used are as follows.
pH control agent: 28% ammonia water
Film-forming aid: diethyleneglycol diethyl ether
[Production of Coated Plate for Rain Streak Test]

A test coated plate was produced in the same manner as that for production of the coated plate for initial water resistance test, except that a white pigment was used for the primer.

The coating film was placed to face the south at 45° and exposed to the outdoor environment for one month. The rain streak stain on the surface was visually observed.

No rain streak stain was observed in Example 1.

Rain streak stain was visually observed in Comparative Example 4.

[XPS Measurement, Surface SEM, Production of Coated Plate for Adhesion Test]

A chromate-treated aluminum plate was preheated to 60° C., and then coated with the aqueous dispersion obtained in each of the examples and comparative examples using a bar coater #10, followed by drying at 100° C. for three minutes using a fan dryer. Thereby, a test coated plate was obtained.

Production of Coated Plate for Adhesion Test

A Galvalume® steel plate, a PET plate, a polycarbonate plate, a cold rolled steel plate, or a glass plate was coated with the aqueous dispersion obtained in each of Examples 1 to 7 and Comparative Examples 1 to 4 using a bar coater #10, and then dried at 100° C. for 30 minutes using a fan dryer.

The adhesion test on the glass plate resulted in good and the cross-cut test resulted in 25/25 in Example 1.

The results of the adhesion tests on the Galvalume® steel plate, the PET plate, the polycarbonate plate, and the cold rolled steel plate are shown in Table 1.

The adhesion test resulted in poor and the cross-hatch test resulted in 0/25 in Comparative Example 4.

TABLE 1

| | | Example 1 | Example 2 | Example 3 | Example 4 | Comparative Example 1 | Comparative Example 2 |
|---|---|---|---|---|---|---|---|
| | Amount of polysiloxane | 5 | 7.5 | 10 | 2.5 | 0 | 5 |
| | Flouropolymer/(meth)acrylic polymer/siloxane polymer ratio (mass ratio) | 50/45/5 | 50/42.5/7.5 | 50/40/10 | 50/47.5/2.5 | 50/50/0 | 50/50/5 |
| | Fluoropolymer | VTC | VTC | VTC | VTC | VTC | VTC |
| | Hydrolyzable silyl group-containing unsuturated monomer | Present | Present | Present | Present | Absent | Absent |
| | Condensation conditions of siloxane polymer silane | Acidic 80° C. | Acidic 80° C. | Acidic 80° C. | Acidic 80° C. | — | Alkaline Room temperature |
| Emulsion properties | Viscosity (mP·s) | 30 | 30 | 30 | 30 | 30 | 30 |
| | Aggregate generation | Not generated | Not generated | Not generated | Not generated | Not generated | Not generated |
| | TEM photograph | Si segregation on particle surface | Si segregation on particle surface | Si segregation on particle surface | Si segregation on particle surface | — | — |
| | TEM strength (Si/F (Particles-Blank) (atom %) | 0.5 | 0.47 | 0.49 | 0.3 | −0.33 | −0.33 |
| Coating film properties | Initial water resistance | Good | Good | Good | Good | Good | Good |
| | Film appearance | Transparent, no foreign substance found | Transparent, no foreign substance found | Transparent, no foreign substance found | Transparent, no foreign substance found | Transparent, no foreign substance found | Transparent, no foreign substance found |
| | Honeycomb pattern (surface SEM) | Formed | Formed | Formed | Formed | Formed | Formed |

TABLE 1-continued

| | | | | | | | |
|---|---|---|---|---|---|---|---|
| Adhesion to Galvalume ® steel plate | Adhesion evaluation | Good | Good | Good | Fair | Poor | Poor |
| | Cross-cut test | 25/25 | 25/25 | 25/25 | 15/25 | 0/25 | 0/25 |
| Adhesion to PET plate | Adhesion evaluation | Good | Good | Good | Poor | Poor | Poor |
| | Cross-cut test | 25/25 | 25/25 | 25/25 | 0/25 | 0/25 | 0/25 |
| Adhesion to polycarbonate plate | Adhesion evaluation | Good | Good | Good | Poor | Poor | Poor |
| | Cross-cut test | 25/25 | 25/25 | 25/25 | 0/25 | 0/25 | 0/25 |
| Adhesion to cold rolled steel plate | Adhesion evaluation | Good | Good | Good | Good | Poor | Poor |
| | Cross-cut test | 25/25 | 25/25 | 25/25 | 25/25 | 0/25 | 0/25 |

| | | Comparative Example 3 | Comparative Example 4 | Example 5 | Example 6 | Example 7 |
|---|---|---|---|---|---|---|
| Amount of polysiloxane | | 5 | 0 | 5 | 5 | 5 |
| Flouropolymer/(meth)acrylic polymer/siloxane polymer ratio (mass ratio) | | 50/50/5 | 50/50/0 | 50/50/5 | 50/50/5 | 35/60/5 |
| Fluoropolymer | | VTC | VTC | VTC | VTC | VTC |
| Hydrolyzable silyl group-containing unsuturated monomer | | Absent | Present | Present | Present | Present |
| Condensation conditions of siloxane polymer silane | | Alkaline 80° C. | — | Alkaline Room temperature | Alkaline 80° C. | Alkaline 80° C. |
| Emulsion properties | Viscosity (mP · s) | 100 | 30 | 30 | 900 | 30 |
| | Aggregate generation | Generated | Not generated | Not generated | Generated | Not generated |
| | TEM photograph | — | Very little Si segregation on particle surface | Little Si segregation on particle surface | Little Si segregation on particle surface | — |
| | TEM strength (Si/F (Particles-Blank) (atom %) | 0.12 | −0.06 | 0.55 | 0.59 | — |
| Coating film properties | Initial water resistance | Good | Good | Good | Good | Good |
| | Film appearance | Transparent, no foreign substance found | Transparent, no foreign substance found | Transparent, no foreign substance found | Transparent, no foreign substance found | Transparent, no foreign substance found |
| | Honeycomb pattern (surface SEM) | Formed | Formed | Formed | Formed | Formed |
| Adhesion to Galvalume ® steel plate | Adhesion evaluation | Poor | Poor | Good | Good | Good |
| | Cross-cut test | 0/25 | 0/25 | 25/25 | 25/25 | 25/25 |
| Adhesion to PET plate | Adhesion evaluation | Poor | Poor | Good | Good | Good |
| | Cross-cut test | 0/25 | 0/25 | 25/25 | 25/25 | 25/25 |
| Adhesion to polycarbonate plate | Adhesion evaluation | Poor | Poor | Good | Good | Good |
| | Cross-cut test | 0/25 | 0/25 | 25/25 | 25/25 | 25/25 |
| Adhesion to cold rolled steel plate | Adhesion evaluation | Poor | Poor | Good | Good | Good |
| | Cross-cut test | 0/25 | 0/25 | 25/25 | 25/25 | 25/25 |

Figure 2:
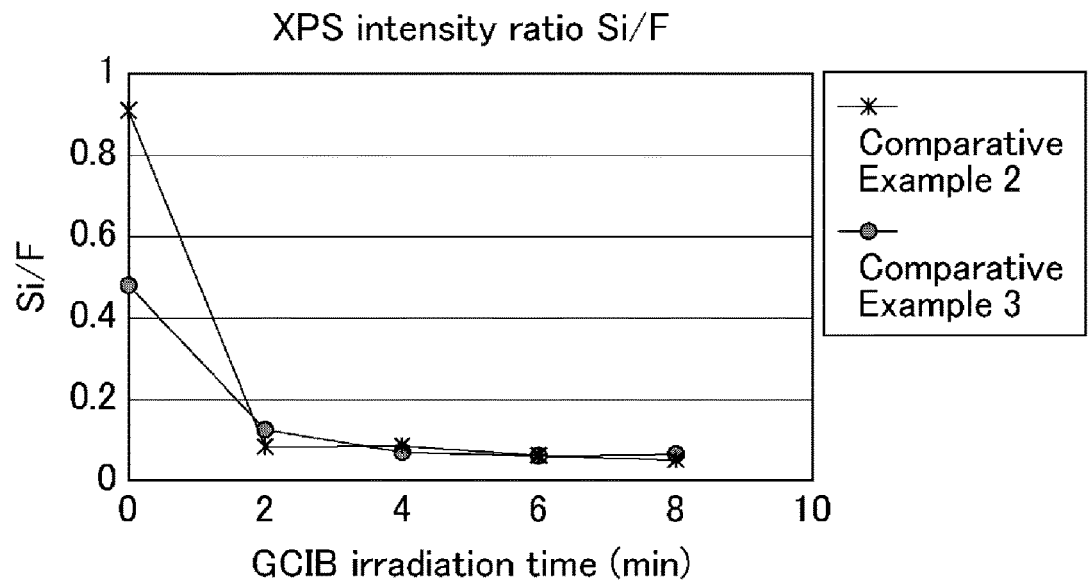
FIG. 2 is a graph summarizing the results of XPS measurement on the surfaces of coating films obtained in Comparative Examples 2 and 3.

FIG. 1 and FIG. 2 each are a graph in which the XPS measurement results and (intensity of Si/intensity of F) are plotted. The graphs show that Si segregated on the surface of each of the coating films obtained in the examples, although the charged amount was smaller than that of fluorine.

FIG. 3 to FIG. 14 show the results of surface SEM and elemental mapping. The results of the elemental mapping also show that Si segregated on the surface of each of the coating films obtained in the examples, although the charged amount was smaller than that of fluorine.

Figure 4:
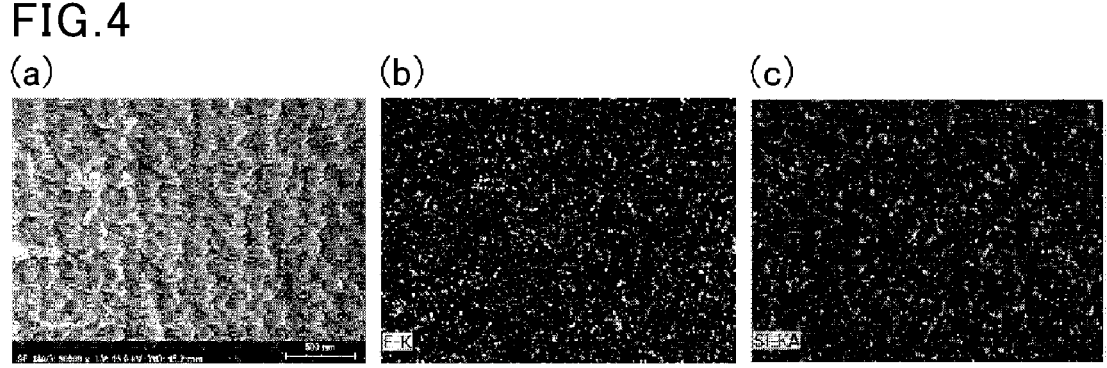
FIG. 4 includes a backscattered electron image and elemental mapping images obtained from SEM observation of the surface of the coating film obtained using the aqueous dispersion from Example 1.

FIG. 3 is the secondary electron image obtained from SEM observation of the surface of the coating film obtained using the aqueous dispersion from Example 1. FIG. 4 includes the backscattered electron image and the results of elemental mapping. FIG. 4(a) is the backscattered electron image, FIG. 4(b) is the elemental mapping image of fluorine atoms, and FIG. 4(c) is the elemental mapping image of silicon atoms.

Figure 6:
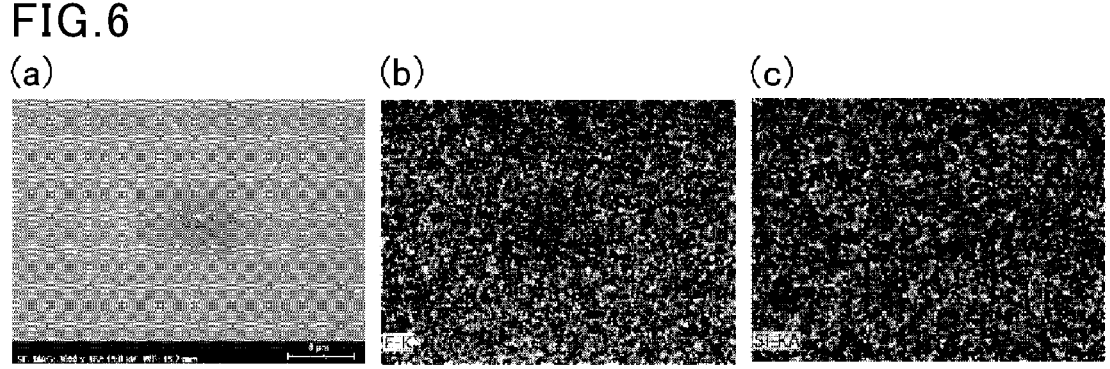
FIG. 6 includes a backscattered electron image and elemental mapping images obtained from SEM observation of the surface of the coating film obtained using the aqueous dispersion from Example 2.

FIG. 5 is the secondary electron image obtained from SEM observation of the surface of the coating film obtained using the aqueous dispersion from Example 2. FIG. 6 includes the backscattered electron image and the results of elemental mapping. FIG. 6(a) is the backscattered electron image, FIG. 6(b) is the elemental mapping image of fluorine atoms, and FIG. 6(c) is the elemental mapping image of silicon atoms.

Figure 8:
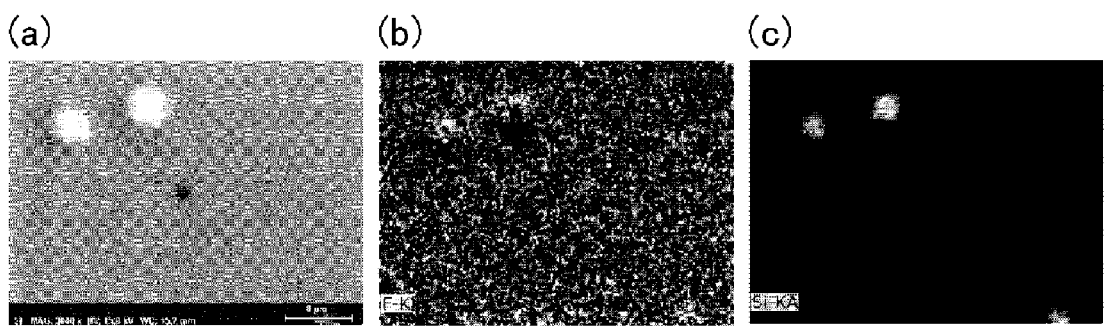
FIG. 8 includes a backscattered electron image and elemental mapping images obtained from SEM observation of the surface of the coating film obtained using the aqueous dispersion from Example 3.

FIG. 7 is the secondary electron image obtained from SEM observation of the surface of the coating film obtained using the aqueous dispersion from Example 3. FIG. 8 includes the backscattered electron image and the results of elemental mapping. FIG. 8(a) is the backscattered electron image, FIG. 8(b) is the elemental mapping image of fluorine atoms, and FIG. 8(c) is the elemental mapping image of silicon atoms.

Figure 9:
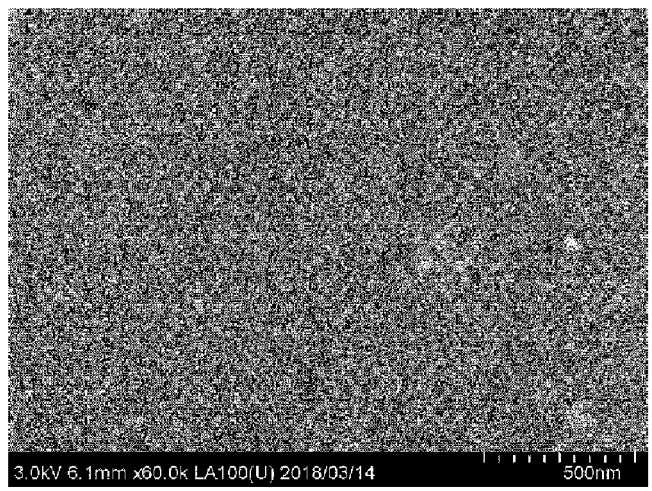
FIG. 9 is a secondary electron image obtained from SEM observation of the surface of a coating film obtained using an aqueous dispersion from Comparative Example 1.
Figure 10:
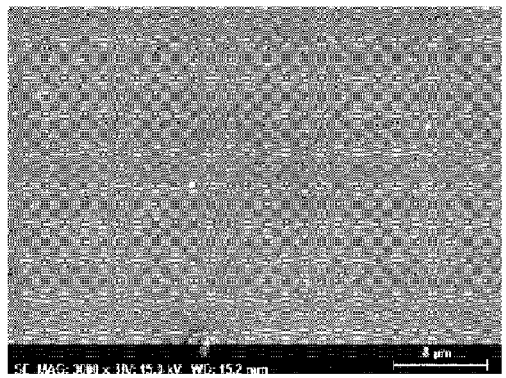
FIG. 10 includes a backscattered electron image and an elemental mapping image obtained from SEM observation of the surface of the coating film obtained using the aqueous dispersion from Comparative Example 1.
Figure 10:
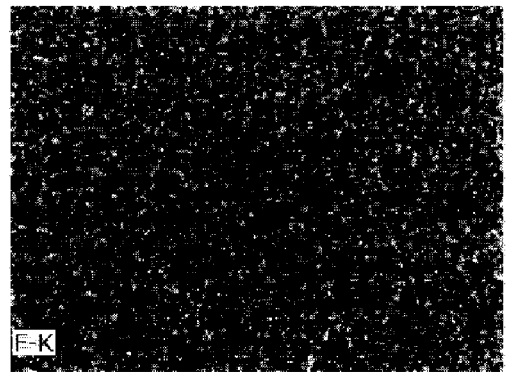

FIG. 9 is the secondary electron image obtained from SEM observation of the surface of the coating film obtained using the aqueous dispersion from Comparative Example 1. FIG. 10 includes the backscattered electron image and the result of elemental mapping. FIG. 10(a) is the backscattered electron image and FIG. 10(b) is the elemental mapping image of fluorine atoms.

Figure 11:
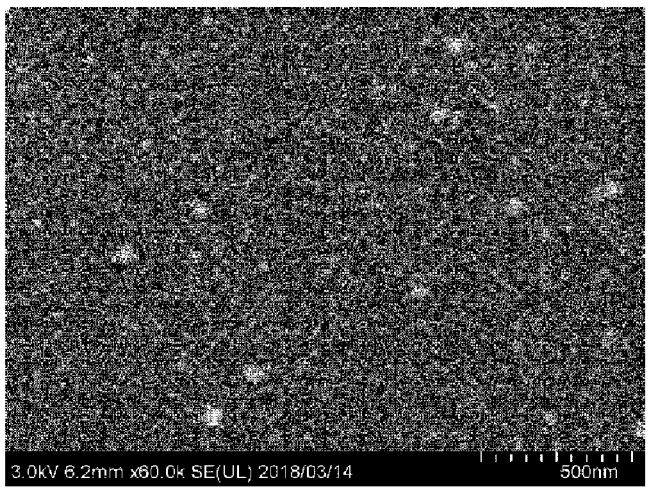
FIG. 11 is a secondary electron image obtained from SEM observation of the surface of a coating film obtained using an aqueous dispersion from Comparative Example 2.
Figure 12:
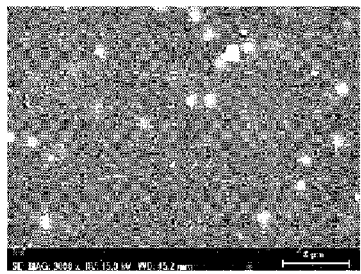
FIG. 12 includes a backscattered electron image and elemental mapping images obtained from SEM observation of the surface of the coating film obtained using the aqueous dispersion from Comparative Example 2.
Figure 12:
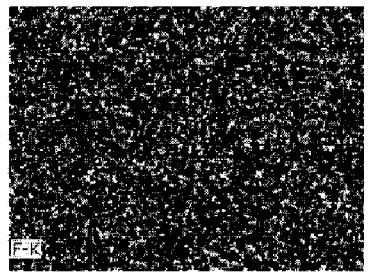
Figure 12:
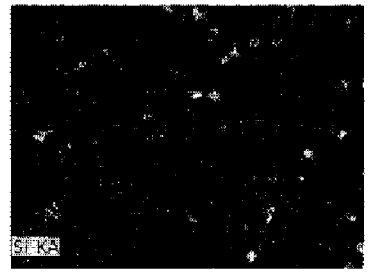

FIG. 11 is the secondary electron image obtained from SEM observation of the surface of the coating film obtained using the aqueous dispersion from Comparative Example 2. FIG. 12 includes the backscattered electron image and the results of elemental mapping. FIG. 12(a) is the backscattered electron image, FIG. 12(b) is the elemental mapping image of fluorine atoms, and FIG. 12(c) is the elemental mapping image of silicon atoms.

FIG. 13 is the secondary electron image obtained from SEM observation of the surface of the coating film obtained using the aqueous dispersion from Comparative Example 3. FIG. 14 includes the backscattered electron image and the results of elemental mapping. FIG. 14(a) is the backscattered electron image, FIG. 14(b) is the elemental mapping image of fluorine atoms, and FIG. 14(c) is the elemental mapping image of silicon atoms.

The invention claimed is:

1. An aqueous dispersion comprising
a particulate resin composite that contains a fluorine-containing resin and an inorganic polymer,
the fluorine-containing resin containing a hydrolyzable silyl group-containing unsaturated monomer unit,
wherein the viscosity of the aqueous dispersion is 500 mPa·s or lower at 25° C. when the solids concentration is 49 to 51% by mass,
wherein the fluorine-containing resin contains a fluoropolymer and a (meth)acrylic polymer,
wherein the fluoropolymer contains at least one unit derived from a fluoroolefin selected from the group consisting of vinyl fluoride, vinylidene fluoride, tetrafluoroethylene, hexafluoropropylene, and chlorotrifluoroethylene,
wherein the (meth)acrylic polymer contains the hydrolyzable silyl group-containing unsaturated monomer unit, and at least one acrylic monomer unit selected from the group consisting of acrylic acid, acrylic acid esters, methacrylic acid, and methacrylic acid esters, and
wherein the inorganic polymer is a polysiloxane.

2. An aqueous dispersion comprising
a particulate resin composite that contains a fluorine-containing resin and an inorganic polymer,
the inorganic polymer being segregated on a particle surface of the resin composite,
wherein the viscosity of the aqueous dispersion is 500 mPa·s or lower at 25° C. when the solids concentration is 49 to 51% by mass,
wherein the fluorine-containing resin contains a fluoropolymer and a (meth)acrylic polymer,
wherein the fluoropolymer contains at least one unit derived from a fluoroolefin selected from the group consisting of vinyl fluoride, vinylidene fluoride, tetrafluoroethylene, hexafluoropropylene, and chlorotrifluoroethylene,
wherein the (meth)acrylic polymer contains a hydrolyzable silyl group-containing unsaturated monomer unit, and at least one acrylic monomer unit selected from the group consisting of acrylic acid, acrylic acid esters, methacrylic acid, and methacrylic acid esters, and
wherein the inorganic polymer is a polysiloxane.

3. The aqueous dispersion according to claim 1,
wherein the resin composite has an intensity ratio (silicon atom/fluorine atom) between silicon atoms and fluorine atoms, as determined by a semiquantitative method using a transmission electron microscope, of 0.15 or higher.

4. The aqueous dispersion according to claim 1,
wherein the aqueous dispersion is an aqueous coating material.

5. A coating film obtainable from the aqueous dispersion according to claim 1.

6. A coated article obtainable by applying the aqueous dispersion according to claim 1 to a base material.

7. A method for producing the aqueous dispersion according to claim 1 comprising:
seed polymerizing a (meth)acrylic monomer and a hydrolyzable silyl group-containing unsaturated monomer in an aqueous dispersion containing a fluoropolymer; and
polycondensing silanol in the presence of a (meth)acrylic polymer obtained by the seed polymerization.

8. The production method according to claim 7,
wherein the polycondensing is performed under acidic conditions.

9. The production method according to claim 7,
wherein the seed polymerizing and the polycondensing are performed successively at a maintained temperature of 50° C. or higher.

10. A method for producing the aqueous dispersion according to claim 2 comprising:
seed polymerizing a (meth)acrylic monomer and a hydrolyzable silyl group-containing unsaturated monomer in an aqueous dispersion containing a fluoropolymer; and polycondensing silanol in the presence of a (meth)acrylic polymer obtained by the seed polymerization.

11. The production method according to claim 10, wherein the polycondensing is performed under acidic conditions.

12. The production method according to claim 10, wherein the seed polymerizing and the polycondensing are performed successively at a maintained temperature of 50° C. or higher.

13. The aqueous dispersion according to claim 1, wherein the fluoropolymer contains a unit derived from vinylidene fluoride.

14. The aqueous dispersion according to claim 2, wherein the fluoropolymer contains a unit derived from vinylidene fluoride.

* * * * *